United States Patent
Röhrl

(10) Patent No.: US 11,456,974 B2
(45) Date of Patent: Sep. 27, 2022

(54) METHOD FOR TRANSFERRING TRANSMISSION DATA FROM A TRANSMITTER TO A RECEIVER FOR PROCESSING THE TRANSMISSION DATA AND MEANS FOR CARRYING OUT THE METHOD

(71) Applicant: GIESECKE+DEVRIENT CURRENCY TECHNOLOGY GMBH, Munich (DE)

(72) Inventor: Wolfgang Röhrl, Riemerling (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 424 days.

(21) Appl. No.: 16/064,100

(22) PCT Filed: Dec. 20, 2016

(86) PCT No.: PCT/EP2016/002143
§ 371 (c)(1),
(2) Date: Jun. 20, 2018

(87) PCT Pub. No.: WO2017/108179
PCT Pub. Date: Jun. 29, 2017

(65) Prior Publication Data
US 2019/0007348 A1 Jan. 3, 2019

(30) Foreign Application Priority Data
Dec. 22, 2015 (DE) ...................... 10 2015 016 716.2

(51) Int. Cl.
*H04L 49/9057* (2022.01)
*H04L 49/351* (2022.01)
(Continued)

(52) U.S. Cl.
CPC ........ *H04L 49/9057* (2013.01); *H04L 49/351* (2013.01); *H04L 49/901* (2013.01);
(Continued)

(58) Field of Classification Search
CPC .................................................. H04L 49/9057
(Continued)

(56) References Cited

U.S. PATENT DOCUMENTS

| 5,396,490 A * | 3/1995 | White | H04L 12/56 370/474 |
| 5,440,545 A | 8/1995 | Buchholz et al. | |

(Continued)

OTHER PUBLICATIONS

Caruso, Jeff; Living legends: Ethernet inventor Bob Metcalfe; Network World, May 9, 2011, last retrieved Nov. 1, 2019 from http://networkworld.com/article/2202019/living-legends-ethernet-inventor-bob-metcalfe.html (Year: 2011).*

(Continued)

*Primary Examiner* — Peter G Solinsky
(74) *Attorney, Agent, or Firm* — Workman Nydegger

(57) ABSTRACT

A method involves transferring a transmittal data block from a transmitting device via an Ethernet connection to a receiving device which has a storage for storing a transferred transmittal data block, and a processor for at least partially processing the transferred transmittal data block stored in the storage. The transmitting device forms from the data of the transmittal data block a sequence of Ethernet packets, comprising respectively management data and a transmittal data sub-block. The receiving device receives the Ethernet packets of the respective sequence and, while employing at least a part of the management data, writes the transmittal data sub-blocks of the received Ethernet packets of the sequence of Ethernet packets for the transmittal data block to the storage, wherein not upon or after the writing each of (Continued)

the transmittal data sub-blocks an interrupt is sent to the processor.

18 Claims, 8 Drawing Sheets

(51) Int. Cl.
*H04L 49/901* (2022.01)
*H04L 49/90* (2022.01)
*H04L 69/22* (2022.01)
*G07D 7/00* (2016.01)

(52) U.S. Cl.
CPC .......... *H04L 49/9021* (2013.01); *H04L 69/22* (2013.01); *G07D 7/00* (2013.01)

(58) Field of Classification Search
USPC ......................................................... 370/394
See application file for complete search history.

(56) References Cited

U.S. PATENT DOCUMENTS

| | | | | |
|---|---|---|---|---|
| 6,353,619 | B1* | 3/2002 | Banas | H04L 49/90 |
| | | | | 370/419 |
| 8,345,680 | B2* | 1/2013 | Poulin | H04L 12/66 |
| | | | | 370/389 |
| 9,081,501 | B2 | 7/2015 | Asaad et al. | |
| 9,081,502 | B2 | 7/2015 | Nakajima | |
| 2005/0216608 | A1* | 9/2005 | Wang | G06F 13/28 |
| | | | | 710/22 |
| 2009/0324053 | A1 | 12/2009 | Ross et al. | |
| 2014/0079076 | A1 | 3/2014 | Kamble et al. | |
| 2014/0149981 | A1* | 5/2014 | Luxenberg | G06F 9/45533 |
| | | | | 718/1 |
| 2014/0338457 | A1 | 11/2014 | Domke et al. | |
| 2018/0199096 | A1* | 7/2018 | Shimizu | H04N 21/4122 |

OTHER PUBLICATIONS

German Search Report from DE Application No. DE 102015016716. 2, dated Aug. 4, 2016.

International Search Report from PCT Application No. PCT/EP2016/ 002143, dated May 2, 2017.

\* cited by examiner

METHOD FOR TRANSFERRING TRANSMISSION DATA FROM A TRANSMITTER TO A RECEIVER FOR PROCESSING THE TRANSMISSION DATA AND MEANS FOR CARRYING OUT THE METHOD

BACKGROUND

The present invention relates to a method for transmitting transmittal data from a transmitting device to a receiving device for processing the transmittal data and means for carrying out the method.

Upon a machine check of bank notes, these are transported past a sensor device with one or several sensors which capture at least one physical property of the bank notes and form sensor data describing these. The sensor data captured for a bank note and stored intermediately in the sensor device are sent to an evaluation device which receives and evaluates these, for example, to classify the respective bank note with regard to its authenticity or state. Apparatuses for processing, for example sorting, bank notes, which work in this manner can have, on the one hand, high processing speeds of more than 30 bank notes/seconds and, on the other hand, sensors with a high spatial resolution and thereby a considerable quantity of sensor data for a given bank note. Both leads alternatively, however, in particular in combination, to a considerable stream of sensor data which has to be transferred from the sensor device to the evaluation device. Devices for the fast transfer of the sensor data from a sensor device to an evaluation device can, however, cause considerably costs.

Similar difficulties can occur in general upon processing value documents. In doing so, value documents are understood to be sheet-shaped objects that represent, for example, a monetary value or an authorization and hence should not be manufacturable arbitrarily by unauthorized persons. They hence have features that are not easy to manufacture, in particular to copy, whose presence is an indication of authenticity, i.e. the manufacture by a body authorized for this purpose. Important examples of such value documents are chip cards, coupons, vouchers, checks and in particular bank notes.

SUMMARY

The present invention is hence based on the problem of stating a method for transmitting transmittal data, for example sensor data from a transmitting device to a receiving device which makes a fast data transfer possible, but requires no high effort for carrying out. Further, means are to be stated for carrying out said method.

The object is achieved by a method with the features of claim 1 and in particular a method for transferring a transmittal data block from a transmitting device via an Ethernet connection to a receiving device which has a storage for storing a transferred transmittal data block and a processor for at least partially processing the transferred transmittal data block stored in the storage, in which the transmitting device forms from the data of the transmittal data block a sequence of Ethernet packets, which comprise respectively management data and a transmittal data sub-block, which is formed from at least a part of the data of the transmittal data block, so that the transmittal data sub-blocks of the Ethernet packets of the sequence comprise the data of the transmittal data block, wherein the management data comprise management data, from which is establishable whether one of the Ethernet packets is the last Ethernet packet of the sequence, and sends the formed Ethernet packets via the Ethernet connection to the receiving device, and in which the receiving device receives the Ethernet packets of the respective sequence and while employing at least a part of the management data writes the transmittal data sub-blocks of the received Ethernet packets of the sequence of Ethernet packets for the transmittal data block to the storage, wherein not upon or after the writing each of the transmittal data sub-blocks an interrupt is sent to the processor.

The object is further achieved by a transmitting device with the features of claim 8 and in particular a transmitting device for sending at least one transmittal data block which has a transmission buffer for at least partially and temporarily storing data of the transmittal data block, and an Ethernet interface, and is designed to form a sequence of Ethernet packets from the transmittal data block which respectively comprise management data and a transmittal data sub-block formed from the respective transmittal data block, so that the transmittal data sub-blocks of the Ethernet packets of the sequence comprise the data of the transmittal data block, wherein the management data comprise management data from which is establishable whether one of the Ethernet packets is the last Ethernet packet of the sequence, and to send the Ethernet packets via the Ethernet interface. The transmitting device can be employed for carrying out a method according to the invention.

The object is also achieved by a receiving device having the features of claim 12 and in particular a receiving device for reception of sequences of Ethernet packets which are formable by a transmitting device according to the invention and/or were formed by a method according to the invention, and contain respectively transmitted data sub-blocks of a transmittal data block, having a storage for storing a transferred transmittal data block, a processor for at least partially processing the transmittal data block stored in the storage, and a receiving portion for the reception of sequences of Ethernet packets having data of the transmittal data block and writing the transmitted data sub-blocks respectively contained in the Ethernet packets to the storage while employing at least one part the management data, wherein the receiving portion is further designed such that the receiving portion does not send an interrupt to the processor upon or after the writing of each of the transmittal data sub-blocks. The receiving device can be employed for carrying out a method according to the invention.

Within the scope of the present invention, the method portions executed by the transmitting device are designated in connection with the transfer of a transmittal data block as a transmission method and the method portions executed by the receiving device in connection with the transfer as a reception method.

In the method, data are transferred from the transmitting device to the receiving device. The transmitting device can, in principle, be an arbitrary data source. Preferably, it can, however, be at least a part of a sensor, in particular of a sensor for examining value documents, or comprises this. Particularly such sensors come into consideration which are designed to capture at least one physical property of a value document in a spatially resolved manner and to form sensor data which render the captured property in a spatially resolved manner, i.e. as a function of the location on the value document. Examples for this are ultrasonic sensors, high-resolution optical sensors and/or high-resolution magnetic sensors. The transmitting device can be given, however, according to another alternative preferably by an evaluation device or at least one portion of an evaluation device which processes data, for example sensor data, itself and transfers at least a part of the data and/or partial results or results of the processing to at least one other device, so that they are further processed there.

The transmitting device can have a transmission buffer, i.e. at least one region of a, preferably volatile, storage which is employed for storing the transmittal data, preferably only temporary storing, of the transmittal data. Further, the transmitting device can also have at least one component which writes the transmittal data to the transmission buffer.

The receiving device can be, in principle, an arbitrary apparatus, which receives and preferably processes data, in particular the transmittal data. In the simplest case, the processing needs to comprise only the storing or relaying of the data. Preferably the processing comprises, however, the establishing of a result from the received transmittal data which are not the data themselves. Preferably the receiving device can be an evaluation device for processing the received transmittal data, in particular sensor data. The receiving device can comprise a storage for at least temporarily storing received data and at least one processor for at least partially processing the received transmittal data. In another embodiment, a receiving device according to the invention can also be at least one portion of a sensor, in particular of a sensor for examining value documents, or be a sensor device or comprise the one or the other. Particularly such sensors come into consideration which are designed to capture at least one physical property of a value document in a spatially resolved manner and to form sensor data which render the captured property in a spatially resolved manner, i.e. as a function of the location on the value document.

In the method, the transmitting device transfers the transmittal data of the transmittal data block via an Ethernet connection to the receiving device. For this purpose, the transmitting device can comprise an Ethernet interface and be designed such that transmittal data to be transferred are transferred via the Ethernet interface. The receiving device receives the data sent via the Ethernet interface. For this it is connected to the transmitting device via the Ethernet connection and can have the receiving portion.

In the method, a transmittal data block is transferred. A transmittal data block is understood to mean a quantity of data which according to a pre-specified criterion are regarded and treated as cohesive, but do not necessarily need to be stored in a storage of the transmitting device in a gapless or contiguous region. In the case of transmittal data of a sensor, the transmittal data block can in particular comprise those sensor data which were formed for a value document.

From the data of the transmittal data block, the transmitting device forms a sequence of Ethernet packets which comprise respectively management data and a transmittal data sub-block. The transmittal data sub-blocks are formed from the data of the transmittal data block such that the transmittal data sub-blocks of the sequence of the formed Ethernet packets comprise altogether the data of the transmittal data block so that the transmittal data block is restorable from the transmittal data sub-blocks of the sequence.

Further, the Ethernet packets contain respectively management data. These can comprise initially the conventional management data in Ethernet packets, for example a source address and a target address, and a type identifier. Further, the management data for the Ethernet packets contain management data from which there is establishable whether the Ethernet packet is the last Ethernet packet of the sequence. For example, a corresponding bit could be set, other possibilities are still described hereinafter. Preferably, there is also establishable from management data in the management portion whether an Ethernet packet is the first one of the sequence. This has the asset that upon reception, it can be recognized that data of a new transmittal data block are transferred.

Preferably, the Ethernet packets can be constructed such that these comprise a conventional management portion (Ethernet Header) having a part of the management data like source address and target address as well as a type identifier, where applicable a VLAN tag, and a useful data block (payload), so that the Ethernet packets have the conventional form. Within the scope of the present invention, those management data which are not contained in the conventional management portion, are designated are protocol management data. The useful data block can then contain those management data which are not contained in the conventional management portion, thus the protocol management data, and the transmittal data sub-block. The useful data block can have the conventional length. However, the so-called jumbo blocks can also be employed, which are substantially greater. This design makes the employment of commercially available components possible.

These Ethernet packets are transferred to the receiving device via the Ethernet connection. This receives the Ethernet packets. In the receiving device according to the invention, the receiving portion is employed for this purpose. The transmittal data sub-blocks of the Ethernet packets of the sequence are written, preferably directly, i.e. without participation of the processor, to the storage of the receiving device. In doing so, however, an interrupt is not sent to the processor for each writing of a transmittal data sub-block upon writing to the storage. In doing so, an interrupt is understood to mean a signal for a processor, generated by hardware (or software), which displays an event which requires an immediate attention or reaction of the processor, and in particular can lead to the processor interrupting the execution of program code which is just being executed by it. This has the advantage that by a transfer of a large transmittal data block via a fast Ethernet connection, a plurality of Ethernet packets are formed and transferred, wherein, however, an interrupt is not triggered for each reception of the formed Ethernet packets. If an interrupt would be triggered upon each reception of an Ethernet packet of the sequence, the reception of the transmittal data would lead to a frequent interruption of the execution of a program, in particular for evaluating data, and thereby substantially hinder the execution of the program.

The transmittal data sub-blocks can be written to the storage such that the transmittal data block is restored.

In this manner, widespread, inexpensive components which work according to the Ethernet standard can be employed, without strongly hindering the evaluation device in the evaluation of data. Further, transmitting device and receiving device can be designed in such a way that these are galvanically isolated from each other.

In principle, the transmitting device can form the Ethernet packets arbitrarily. According to the first embodiment, the transmitting device preferably has a processor and instructions of a computer program upon whose execution the processor of the transmittal data block forms at least the transmittal data sub-blocks, preferably also at least the protocol management data, for the sequence of Ethernet packets in the transmission buffer. This embodiment has the advantage of being especially easy to realize.

According to a further embodiment, the transmitting device can have an FPGA (Field Programmable gate array)

connected to the Ethernet interface or at least forming a part of the Ethernet interface, which is configured or programmed such that it forms from the transmittal data block the management data and the transmittal data sub-blocks for the respective sequence of Ethernet packets. The protocol management data and the transmittal data sub-blocks are preferably relayed as a useful data block to the Ethernet interface for sending as an Ethernet packet. Preferably, the Ethernet interface can have a PHY which is connected to the FPGA via a data connection, wherein the FPGA is further configured or programmed such that it also works as an Ethernet controller. This embodiment is advantageous in particular if the transmitting device can also serve as a receiving device. The FPGA is then preferably configured or programmed such that it can execute also the functions of an FPGA of the receiving device, as is described hereinafter.

Further, the Ethernet interface can have an Ethernet controller in the transmitting device, having an internal DMA functionality, which is designed such that it can process descriptor lists independently. The processor then needs to transmit to the Ethernet controller only a descriptor list with the addresses of the transmission buffer regions to be employed as a useful data block to the Ethernet controller which reads the useful data blocks for the Ethernet packets from the transmission buffer by means of the DMA functionality (Direct Memory Access functionality). This embodiment is in particular advantageous in transmitting apparatuses which have no FPGA.

In the method, it is provided that in the receiving device not upon or after each writing of transmittal data sub-blocks of received Ethernet packets to the storage, an interrupt is emitted to the processor of the receiving device. In the method, preferably a receive signal, for example an interrupt, is emitted to the processor, preferably emitted only if a pre-specified amount of Ethernet packets of the same sequence were received and the data or transmittal data of the transmittal data sub-blocks therein were written to the storage and/or upon receiving or storing at least one pre-specified error occurs and/or the transmittal data from the useful data block or transmittal data sub-block of the last Ethernet packet of the sequence were written to the storage. In the receiving device, the receiving portion is then preferably designed such that it emits a receive signal, for example an interrupt, to the processor, preferably emits only if a pre-specified amount of Ethernet packets of the sequence were received and the transmittal data sub-blocks therein were written to the storage and/or upon receiving or storing at least one pre-specified error occurs and/or the transmittal data from the useful data block of the last Ethernet packet of the sequence were written to the storage. In doing so, the pre-specified amount of Ethernet packets is preferably greater than 5. In particular the last alternative, where applicable in combination with the next to last alternative, has the advantage that the sending of the interrupt only after reception of the last Ethernet packet of the sequence leads to an merely very low load of the processor of the receiving device.

In principle, the receiving portion of the receiving device can be designed arbitrarily according to its function. In the method it is preferred, however, that the receiving device has an FPGA and by means of the FPGA, while employing of the management data, the transmittal data sub-blocks from received Ethernet packets are written to the storage and that preferably after the writing of the transmittal data sub-blocks of a pre-specified amount of Ethernet packets of the sequence to the storage and/or writing of the last transmittal data sub-block of the sequence, triggers the emitting of a receive signal, for example an interrupt, to the processor. This offers the advantage that FPGAs are easily available and have a high processing speed, which relieves the processor. For this, the receiving device can have an FPGA in the receiving portion, wherein the receiving portion is designed such and the FPGA is configured or programmed such that by means of the FPGA, while employing the management data, the transmittal data sub-blocks from received Ethernet packets are written to the storage and that preferably the FPGA after writing the transmittal data sub-blocks of a pre-specified amount of Ethernet packets of the sequence to the storage and/or writing of the last transmittal data sub-block of the sequence, triggers the emitting of a receive signal, for example an interrupt, to the processor.

According to a design form, the receiving portion can have an Ethernet controller having a PHY (Ethernet Physical Layer Transceiver) and a Media Access Controller which is connected to the FPGA, wherein the FPGA is configured in particular or programmed such that it receives useful data blocks of the received Ethernet packets and writes the transmittal data sub-blocks contained therein to the storage while employing of the management data.

According to another embodiment, the receiving portion can have a PHY which is connected to the FPGA via a data connection, wherein the FPGA is further configured or programmed such that it also works as an Ethernet controller. The FPGA is then devised to write transmittal data sub-blocks from Ethernet packets obtained by the PHY, preferably directly, to the storage. This embodiment has the advantage that through the integration of the Ethernet controller, or its function in the FPGA, the receiving device is easier to manufacture and in particular the data connection between Ethernet controller and FPGA can be omitted.

In both embodiments, FGPA, processor and storage can in principle be connected in arbitrary manner via data connections. Preferably, the FPGA, the processor and the storage are connected in the receiving device via a PCIe network. This offers the advantage that a high data throughput can easily be achieved. If the transmitting device also has an FPGA, therein preferably at least the FPGA and the transmission buffer are connected via a PCIe network.

In the method, it suffices in principle that the management data comprise management data from which is establishable whether an Ethernet packet of the sequence of Ethernet packets is the last of the sequence. In a preferred embodiment, in the method, the management data of each of the Ethernet packets of the sequence of Ethernet packets can comprise a sequence identifier for the transmittal data block which characterizes the transmittal data sub-block such that upon their employment, the transmittal data block can be formed from the transmittal data sub-blocks, and the sequence identifier is employed for writing the transmittal data sub-blocks to the storage. In doing so, the sequence identifier is employed by the receiving portion, if this possesses an FPGA, preferably by the FPGA. Thereby, errors due to mixing up packages can be avoided. Further, the sequence identifier can be employed to check the completeness of the transmission of the transmittal data block. A writing can then be effected only with an appropriate sequence identifier, otherwise an error is ascertained which leads preferably to the emitting of a signal which leads to a repeated forwarding of the transmittal data sub-block, preferably of the transmittal data block.

In particular, there can be establishable from the sequence identifier in what order the transmittal data sub-blocks or Ethernet packets of the sequence were formed, and the receiving device can preferably write the transmittal data sub-blocks of the sequence to the storage according to their order given by the sequence identifier so that the transmittal data block results. The transmitting device can for this purpose preferably be further designed such that upon forming the sequence of Ethernet packets it forms management data, which comprise sequence identifiers, from which is establishable in what order the transmittal data sub-blocks or Ethernet blocks of the sequence were formed. In the receiving device, the receiving portion can preferably be designed correspondingly such that, in the case of the employment of an FPGA, this is configured or programmed to establish an order of the transmittal data sub-blocks of the sequence from the sequence identifiers in the management data and which writes the transmittal data sub-blocks of the sequence corresponding to their order given by the sequence identifiers to the storage, so that the transmittal data block results. This has in particular the advantage that the restoration of the transmittal data block is easier and a loss of an Ethernet packet is simply ascertainable. In the receiving device, the receiving portion can be designed, in the case of the employment of an FPGA configured or programmed such that upon writing the transmittal data sub-blocks, the transmittal data sub-blocks are written to the storage according to their order so that the transmittal data block results.

In most cases of application, not only a transmittal data block will be transmitted, but successively several transmittal data blocks, for example for consecutive value documents. For the method it is hence preferred that the management data of each of the Ethernet packets of the sequence of Ethernet packets can comprise a sequence identifier for the transmittal data block which characterizes the transmittal data block, and preferably the transmittal data block identifier is employed upon reception of the Ethernet packets of the sequence and/or upon writing the transmittal data sub-blocks. For the transmitting device it is for this purpose preferred that it is designed such that the management data of each of the Ethernet packets of the sequence of Ethernet packets can comprise a sequence identifier for the transmittal data block which characterizes the transmittal data block. In the receiving device it is hence preferred that the management data of each of the Ethernet packets of the sequence of Ethernet packets for the transmittal data block comprise a transmittal data block identifier which characterizes the transmittal data block, and the receiving portion is designed such that it employs the transmittal data block identifier upon reception of the Ethernet packets of the sequence and/or upon writing the transmittal data sub-blocks. Insofar as the receiving portion comprises an FPGA, this can be configured or programmed such that it employs the transmittal data block identifier upon reception of the Ethernet packets of the sequence and/or upon writing the transmittal data sub-blocks. The transmittal data block identifier can be employed in particular such that this is checked and only transmittal data sub-blocks with the same transmittal data block identifier are written to a region of the storage provided for received data.

It is possible that errors occur upon the transfer of Ethernet packets. In the method, it is for this purpose preferred that for at least one of the transmittal data sub-blocks at least two Ethernet packets are formed whose useful data block contains respectively the transmittal data sub-block and are sent via the Ethernet connection to the receiving device and upon reception of more than one Ethernet packet for the same transmittal data sub-block the data of the transmittal data sub-block are written only once to the storage or the data of the transmittal data sub-block are overwritten in the storage. The transmitting device can for this purpose preferably be designed such that it forms for at least one of the transmittal data sub-blocks, preferably each of the transmittal data sub-blocks, at least two Ethernet packets whose useful data block contains respectively the transmittal data sub-block and sends these via Ethernet connection to the receiving device. In the receiving device, the receiving portion can further be designed preferably such that, upon reception of more than one Ethernet packet for the same transmittal data sub-block, this writes the data of the transmittal data sub-block to the storage only once or overwrites the data of the transmittal data sub-block in the storage. For this purpose, it employs preferably at least a part of the management data. For example, it can check whether an Ethernet packet with the same transmittal data sub-block was already received, and if this is the case, discard the Ethernet packet or overwrite the transmittal data sub-block in the storage. This allows to prevent the loss of individual Ethernet packets in a simple manner.

A preferred development concerns the case that several transmitting devices have to transfer transmittal data blocks to the same receiving device. In a preferred development of the method, at least one further transmitting device which is connected to the receiving device via an Ethernet connection, forms from the data of a further transmittal data block to be sent by it, a further sequence of Ethernet packets which comprise respectively management data and a transmittal data sub-block which is formed from at least a part of the data, so that the transmittal data sub-blocks of the Ethernet packets of the further sequence comprise the data of the further transmittal data block, wherein the management data comprise management data, from which is establishable whether one of the Ethernet packets is the last Ethernet packet of the further sequence, and sends the formed Ethernet packets via the Ethernet connection to the receiving device. In the method, the receiving device can, after the receiving of the Ethernet packets, process these in dependence on the transmitting device which has sent these, preferably separated according to transmitting device. In particular, the separate processing can consist in the fact that, separated according to transmitting device, the identical processing steps are executed while employing the management data, wherein the transmittal data sub-blocks are written by a respective transmitting device to a respective memory area which is associated with the respective transmitting device, for example by the processor of the receiving device. Subject matter of the invention is hence a system with at least two transmitting devices according to the invention and such a receiving device in which the transmitting devices are connected to the receiving device via Ethernet connections.

The connection of the transmitting devices to the receiving device can be effected, for example directly, i.e. via point-to-point connections. In a preferred development, the receiving device then comprises several PHY which are connected to the FPGA, and the FPGA is configured or programmed such that it writes to the storage respectively transmittal data sub-blocks of Ethernet packets, which were received from a respective one of the PHY obtained, so that the respective transmittal data block is restored. In doing so, the transmittal data sub-blocks for the transmittal data block are written to a part of the storage which is connected to the respective PHY and thereby the transmitting device connected thereto. In doing so, an Ethernet controller can be provided for each PHY which receives Ethernet packets received from the PHY and sends at least the useful data to the FPGA. However, the FPGA is preferably configured or programmed such that it forms together with a respective one of the PHY respectively an Ethernet controller. This embodiment offers the advantage that several transmitting devices can be connected to a receiving device via Ethernet connections, in respectively one of the transmitting devices is connected to one of the PHY. The FPGA is in particular configured or programmed such that in the case that respectively one of the transmitting devices sends a sequence of Ethernet packets, which contain the transmittal data sub-blocks for a transmittal data block, and one of the PHY, which is connected to the transmitting device, receives this, writes the transmittal data sub-blocks from the useful data blocks of the received Ethernet packets to the storage such that the transmittal data block is restored.

In the receiving device, the association of Ethernet packets to a transmitting device can then be effected, for example, by the fact that the Ethernet packets are processed in dependence on via which PHY, and thereby which of the transmitting devices, these were received from which the transmitting device is connected to, are processed separately from these, the source of an Ethernet packet, i.e. establish the transmitting device by via which Ethernet interface, in particular which PHY, which packages were received.

The connection of the transmitting devices to the receiving device can, however, also be effected via an Ethernet switch. In the system, the transmitting devices are then connected via Ethernet connections to an Ethernet switch which is connected via an Ethernet connection to the evaluation device. In the method, it can in this case, but also in the case of a point-to-point connection, be established after reception of an Ethernet packet from the management data, which of the transmitting devices the Ethernet packet was sent from, and the Ethernet packet be further processed in dependence on this establishment.

These embodiments or developments also make it possible in particular to receive larger amounts of sensor data from at least two sensors for the identical value document and, where applicable, to evaluate in dependence on each other or in combination with each other.

Further, the receiving device can be also designed as a transmitting device according to the invention, wherein the Ethernet interface is given by a portion the receiving portion, which also works as an Ethernet interface of the transmitting device. In particular, it can have a transmission buffer for at least partially and temporarily storing data of the transmittal data blocks, which can be formed, for example, by a part of the storage of the receiving device and be designed to execute a transmission method according to the invention to form a sequence of Ethernet packets, in particular from a transmittal data block in the transmission buffer, which respectively comprise management data and a transmittal data sub-block formed from the respective transmittal data block, so that the transmittal data sub-blocks of the Ethernet packets of the sequence comprise the data of the transmittal data block, wherein the management data comprise management data from which is establishable whether one of the Ethernet packets is the last Ethernet packet of the sequence and to send the Ethernet packets via the Ethernet interface.

In case that the receiving device has an FPGA, this preferably is additionally configured or programmed such that it forms, from a transmittal data block to be sent, the management data and the transmittal data sub-blocks for the respective sequence of Ethernet packets to be sent. Further, a PHY of the receiving device is employed preferably for receiving as well as sending Ethernet packets.

A further subject matter of the present invention is a system having a transmitting device according to the invention, preferably according to any of claims 8 to 11, and a receiving device connected to the transmitting device via an Ethernet connection, preferably according to any of claims 12 to 18.

In a preferred development, the system can have at least one further transmitting device which is connected to the receiving device via an Ethernet connection. In doing so, according to one embodiment the transmitting devices can be connected to the receiving device via point-to-point Ethernet connections. According to another embodiment, the transmitting devices can be connected to the receiving device via an Ethernet switch.

In a preferred embodiment of the system, the transmitting device can be designed as an evaluation device and the receiving device as an evaluation device.

A further subject matter of the present invention is an apparatus for processing value documents having a feeding device for feeding singled value documents, an output device for outputting processed value documents, a transport device for transporting singled value documents from the feeding device to the output device, a sensor device for capturing physical properties of value documents transported by the transport device and forming sensor data for the respective value document, and an evaluation device connected to the sensor device via an Ethernet connection for evaluating the sensor data of the sensor device and controlling the transport device in dependence on the result of the evaluation of the sensor data, wherein the sensor device is designed as a transmitting device according to the invention for transmitting the sensor data for a value document as a transmittal data block and the evaluation device as a receiving device according to the invention.

In doing so, the processing of value documents is understood to mean the checking of value documents concerning their denomination and/or their authenticity and/or their state and/or the sorting and/or the destroying of value documents.

BRIEF DESCRIPTION OF THE DRAWINGS

The invention will hereinafter be explained further by way of example with reference to the drawings. There are shown.

DETAILED DESCRIPTION OF VARIOUS EMBODIMENTS

Figure 1:
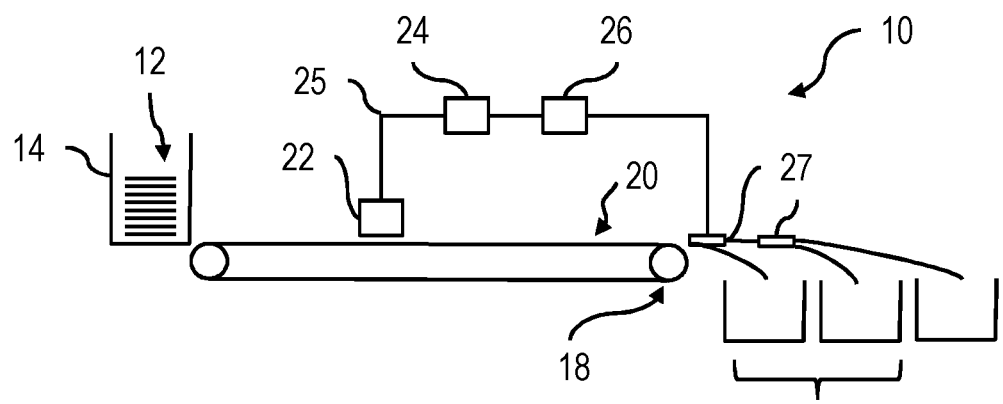
FIG. 1 a schematic view of a bank-note sorting apparatus.

A value-document processing apparatus 10 for processing value documents 12 in FIG. 1 has an input portion 14, an output portion 16 and a transport device 18 by means of which singled value documents 10 can be transported along a certain transport path 20 set by the transport device 18 from the input portion 14 to the output portion 16.

In the transport path 20, a sensor device 22 is arranged by means of whose physical properties, individual value documents transported past can be established while forming sensor raw data, which describe the results of the measurement. In the example, the sensor device 22 comprises an optical remission sensor by means of which a digital image of a value document transported past can be captured.

The value-document processing apparatus 10 further comprises an evaluation device 24 which is connected via a data connection 25 to the sensor device 22 to receive from this sensor raw data for a value document and to evaluate, while forming and emitting an evaluation signal for the value document; in doing so, the evaluation signal represents the result of the evaluation. To the evaluation device 24 is further connected a control device 26, which receives respectively the evaluation signal of the evaluation device 24 for a value document and actuates the transport device 18 in dependence on the received evaluation signal, so that this transports the value document in dependence on the result of the evaluation.

The input portion 14 comprises an input pocket for receiving a stack of value documents 12 and a singler by means of which value documents of a stack are singled in the input pocket and are fed to the transport device 18.

The output portion 16 comprises at least one output pocket, in this example several output pockets, and, in this embodiment example, for each of the output pockets a stacking wheel not shown in the Figures, by means of which value documents fed by the transport device 18 can be placed down in the respective output pocket.

The transport device 18 is designed such that the transport path 20 branches out in the region between the sensor device and the output portion 16 in as many branches as there are output pockets present. At the branching points, respectively gates 27 are arranged which are actuated by means of actuating signals by the control device 24. For example, three output pockets can be provided.

The evaluation device 24 is connected to the sensor device 22 via the data connection 25, an Ethernet connection. It establishes, for a respective value document, from sensor raw data captured for the value document by the sensor device 22 according to a pre-specified method one of several pre-specified sorting classes, for example for value documents classified as "authentic, fit for circulation", "authentic, unfit for circulation" or "suspect". Corresponding to the established sorting class, the evaluation device 24 forms an evaluation signal which represents the established sorting class, and emits this to the control device 26.

In dependence on the evaluation signal, the control device 26 actuates the transport device 18, in particular the gates, with actuating signals such that the value document is transported into one of the output pockets which is provided for value documents of the established sorting class. It can have for this purpose a storage and at least one processor as well as at least one further interface which the transport device 20 is connected to via a signal connection. In the storage, instructions of a computer program can be stored upon whose execution the processor receives the evaluation signals and actuates the transport device, for example their gates, in dependence on the received evaluation signals and, where applicable, further signals.

For sorting value documents in the form of bank notes, a stack of value documents 12 is placed in the input portion 14, in the example more precisely its input pocket. The value documents of the inserted stack are then singled and delivered to the transport device 18 which transports the singled value documents individually to the output portion. In doing so, these pass the sensor device 22 which captures physical properties of a value document transported through its capture region during the transport and forms sensor raw data representing these. These are transferred by the sensor device 22 as a transmitting device via the Ethernet line 25 to the evaluation device 24 as a receiving device which establishes a sorting class for the respective value document and emits an evaluation signal representing these to the control device 26. In dependence on the evaluation signal, the control device 26 actuates the transport device 18, in particular the gates, with actuating signals such that the respective value document is transported into one of the output pockets which is provided for value documents of the established sorting class.

If the remission sensor possesses a high spatial resolution, for example in the region of 0.5 mm, thus transmittal data blocks having sensor raw data, respectively associated with a respective value document, which were captured for the value document by the sensor device 22, are generated for transported value documents, in particular for transport speeds of 25 value documents/seconds and more. Hence a stream of transmittal data blocks is to be transferred in real time to the evaluation device 24 which receives these transmittal data blocks and has to evaluate these, likewise in real time.

Figure 2:
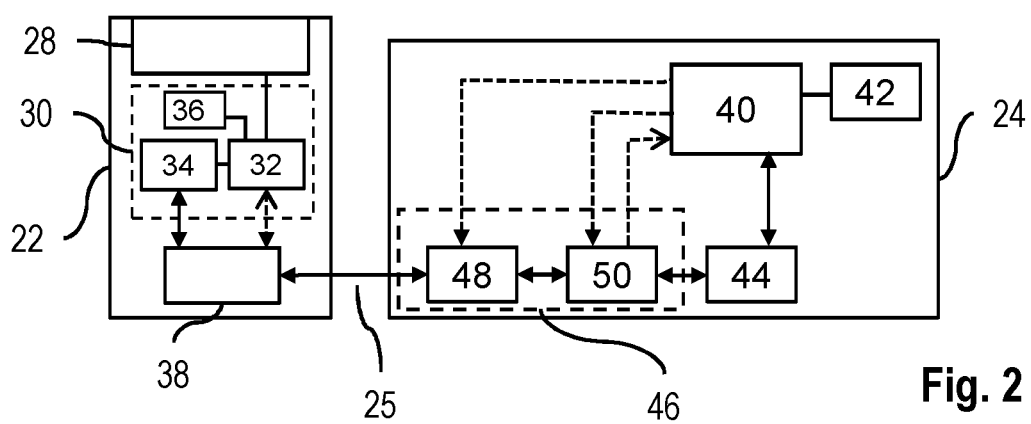
FIG. 2 a schematic representation of a first example of a transmitting device in the form of a sensor device and a receiving device in the form of an evaluation device of the apparatus in FIG. 1, FIG. 3 a schematic representation for illustrating a division of a transmittal data block into Ethernet packets, FIG. 4 a very schematic flowchart which shows transmission steps of a first example of a method for transferring a transmittal data block via an Ethernet connection, FIG. 5 a very schematic flowchart which shows receiving steps of a first example of a method for transferring a transmittal data block via an Ethernet connection, FIG. 6 a very schematic flowchart which shows transmission steps of a second example of a method for transferring a transmittal data block via an Ethernet connection, FIG. 7 a very schematic flowchart which shows receiving steps of a second example of a method for transferring a transmittal data block via an Ethernet connection, FIG. 8 a schematic representation of a second example of a transmitting device in the form of a sensor device, FIG. 9 a schematic representation of a fourth example of a transmitting device in the form of a sensor device and a receiving device in the form of an evaluation device, FIG. 10 a schematic representation of an example of a system with several transmitting devices in the form of the sensor devices and a receiving device in the form of an evaluation device which are interconnected via point-to-point Ethernet connections, FIG. 11 a schematic representation of an example of a system with several transmitting devices in the form of the sensor devices and a receiving device in the form of an evaluation device which are interconnected via an Ethernet switch, FIG. 12 a schematic representation of an example of a system with two evaluation devices interconnected via an Ethernet connection, FIG. 13 a schematic representation of an example of a system with several transmitting devices in the form of the sensor devices, a second receiving device in the form of an evaluation device and a first receiving device in the form of an evaluation device which are interconnected via point-to-point Ethernet connections, FIG. 14 a schematic representation of an example of a system with several transmitting devices in the form of the sensor devices, a second receiving device in the form of an evaluation device and a first receiving device in the form of an evaluation device which are interconnected via an Ethernet switch, and FIG. 15 a schematic block diagram of a portion of a receiving device with a PHY and an FPGA.

As far as the signal processing is concerned, the construction of the remission sensor 22 is shown very schematically in FIG. 2.

Besides the actual detector 28, which converts the optical radiation to electrical signals, there are present a data preprocessing device 30, for example having a controller or processor 32, a working memory 34 and a nonvolatile memory 36, in which the instructions and/or configuration data for execution by the data preprocessing apparatus, for example the controller or processor. The data preprocessing device 30 is connected to the detector 28 via a signal connection; it converts the electrical signals of the detector 28 into sensor raw data, where applicable after a preprocessing. Further, a is connected to the data preprocessing device 30 having an Ethernet interface 38, which comprises an Ethernet controller having a PHY. The data preprocessing device 30 is designed to send sensor raw data in transmittal data blocks via the Ethernet interface 38 via the Ethernet connection 25 to the evaluation device 24. This will be explained more closely hereinafter. The Ethernet controller does not need to have any special properties. In this first embodiment example, the Ethernet controller has, however, an internal DMA functionality and is designed to independently work through descriptor lists. The data processing device then needs to send to the Ethernet controller only a descriptor list, which designates the position of data to be sent in the storage. This can access it directly to send the Ethernet packets.

The evaluation device 24 is likewise shown in FIG. 2 very schematically with its functional components.

It comprises at least a processor 40, a first storage 42, a second storage, in the example a working memory 44, and a receiving portion 46 which in this embodiment example contains an Ethernet interface 48 having an Ethernet controller, which comprises a PHY, and an FPGA 50. The Ethernet interface 48 is designed to be connected to an Ethernet line, in the example the line 25. It is further connected to the FPGA 50, so that at least a part of the data of received Ethernet packets can be relayed to the FPGA 50. On the one hand, the FPGA 50 is connected to the working memory 44 and, on the other hand, to the processor 40 via signal connections. Further connections consist between the processor 40, the FPGA 50 and the Ethernet interface 48. These connections are drawn according to their function.

The dashed arrows with filled tip stand for the transfer of control data of at least one processor 40 to the FPGA 50 or the Ethernet interface 48, the dashed arrow with open tip shows the transmission of a control signal, for example of an interrupt, by the FPGA 50 to at least one processor 40. The continuous arrows represent the data flow of sensor raw data or transmittal data.

PHY stands for that Ethernet component which converts the digital data stream to analog signals on the line, or analog signals on the line to a digital data stream, for example it can be a Physical Layer Transceiver chip. In this embodiment example, the PHY of the evaluation device is realized as a separate component.

In the storage 42, instructions of a computer program are stored upon whose execution through the processor 40 method steps mentioned hereinafter are executed. Further the FPGA 50 is configured or programmed such that it can execute the method steps described hereinafter. In particular, corresponding instructions can be stored in a memory area of the FPGA 50.

The sensor raw data for a respective value document have to be transferred for evaluating in real time by the sensor device 22 as the transmitting device via the Ethernet connection 25 to the evaluation device 24 as the receiving device. The sensor raw data for the respective value documents form transmittal data blocks which are transferred.

The transfer of the sensor raw data for a respective value document, that is a transmittal data block, is effected as follows.

In this embodiment example, the data processing device 30, in the example more precisely its processor 32, stores the established sensor raw data for a value document in its working memory 34 in a memory area managed by it.

The transmitting device 22, in particular its data processing device 30 together with the Ethernet interface 38, forms from the data of the respective transmittal data block 52 a sequence of Ethernet packets 54, which are then sent via the Ethernet connection 25 to the receiving device, here the evaluation device 24. The transmittal data block and the Ethernet packets are shown schematically in FIG. 3.

Each of the Ethernet packets 54 contains a transmittal data sub-block n of the transmittal data sub-blocks and related management data. The Ethernet packet contains the conventional preamble and CRC checksum, both of which are not shown in the Figures.

The transmittal data sub-blocks are formed of at least a part of the transmittal data of the transmittal data block such that the transmittal data sub-blocks of the Ethernet packets of the sequence comprise the data of the transmittal data block. The transmittal data sub-block $ND_n$ is written in the block provided for useful data of each of the Ethernet packets.

Figure 3:
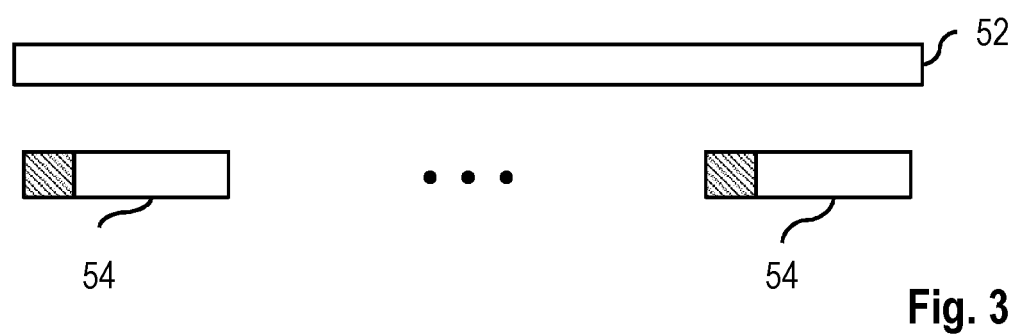

The management data $V_n$, characterized in FIG. 3 by hatching, associated with the transmittal data sub-block n, contain the classical Ethernet management data in the positions provided for Ethernet packets in the respective package: the source address, the target address and a type identifier. The management data comprise further protocol management data which contain or represent transmission information items of the Ethernet packets concerning the formed sequence and optionally the transmittal data block.

The protocol management data comprise, among other things, data from which is establishable whether one of the Ethernet packets is the last Ethernet packet of the sequence.

In the present example, a sequence identifier in the form of a sequence number and an end bit are employed as protocol management data from which is establishable whether a respective Ethernet packet is the first or the last Ethernet packet of the sequence. The sequence number, beginning with 0 for the first Ethernet packet, is incremented respectively by 1 for successively formed Ethernet packets. The end bit is set only for the last Ethernet packet of the sequence, otherwise it is not set.

Further, the protocol management data comprise each of the Ethernet packets of the sequence of Ethernet packets for a respective transmittal data block a transmittal data block identifier which characterizes the transmittal data block; thus Ethernet packets for a transmittal data block are distinguishable from those for another transmittal data block. For each of the Ethernet packets there is thus establishable which transmittal data block it belongs to or transmittal data of which transmittal data blocks it contains.

In this embodiment example, the protocol management data for a transmittal data sub-block and the transmittal data sub-block are stored in a useful data block of the Ethernet packet whose size is standardly pre-specified. In other embodiment examples, Ethernet packets with so-called Jumbo Frames could be also employed.

After formed Ethernet packets were sent to the receiving device via the Ethernet connection, and were received by this or its receiving portion, the receiving device or its receiving portion extracts the transmittal data sub-blocks from the useful data blocks of the received Ethernet packets for the respective one of the transmittal data blocks writes directly to the storage, wherein the receiving portion does not upon each writing of one of the Ethernet packets send an interrupt to the processor.

In this manner, the transmittal data sub-blocks are written to the storage of the receiving device or evaluation device 24, so that the transmittal data block is restored.

Figure 4:
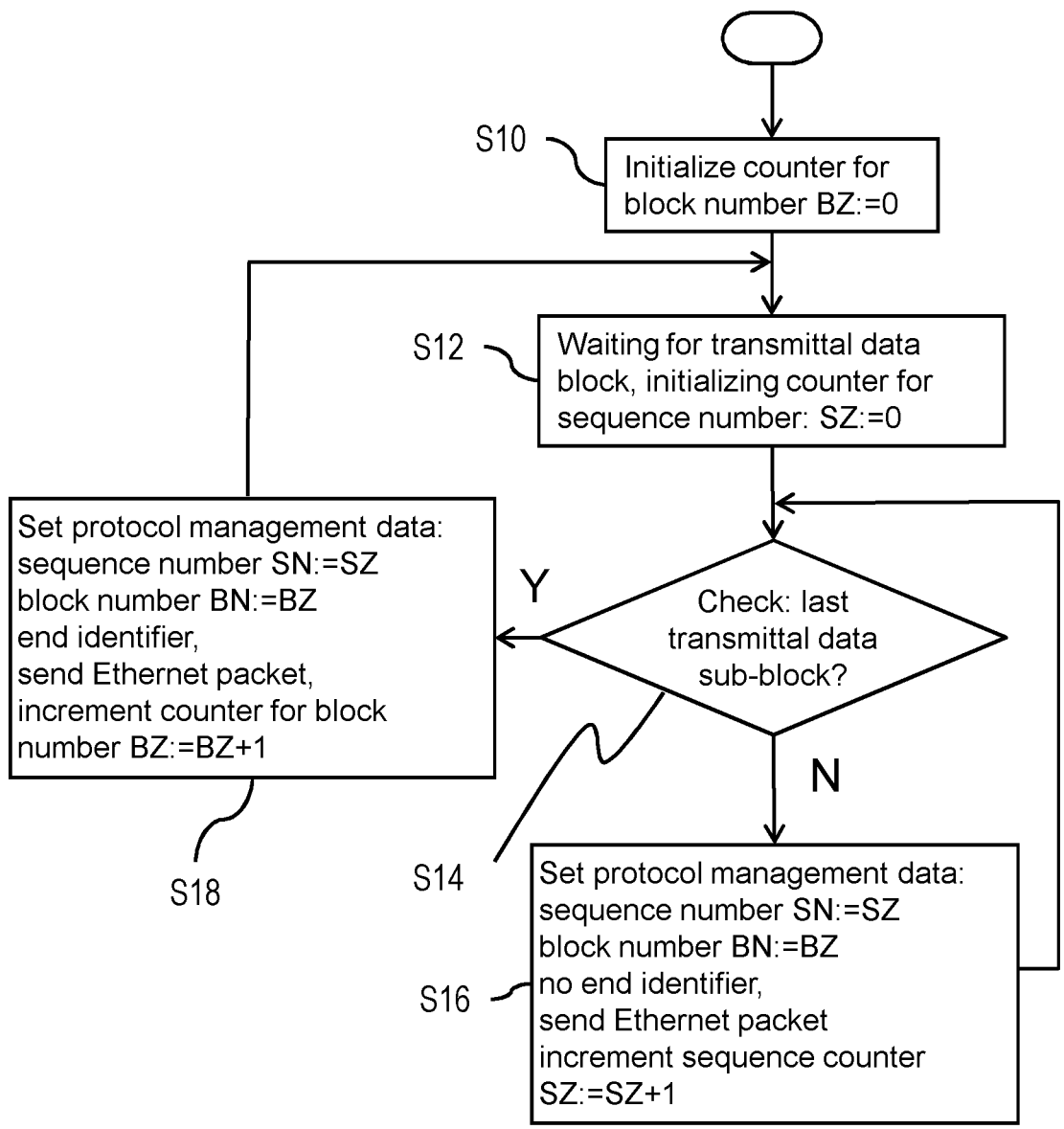

More precisely, the following method is carried out for several sequences of transmittal data blocks which are to be transferred successively by the transmitting device 22 via the Ethernet connection 25 to the evaluation device or reception device 24. The transmission steps of the method, i.e. the transmission method, carried out by the transmitting device 22, more precisely by the data processing device 30 in connection with the Ethernet controller 38, are represented schematically in FIG. 4, the reception steps executed by the receiving device in FIG. 5. For this purpose, corresponding instructions of a computer program are stored in the nonvolatile memory of the transmitting device upon whose execution by the data processing device 30, in the example their controller or processor 32, executes the transmission steps. Correspondingly, the FPGA 50 is so configured or programmed and the instructions of a computer program are stored in the first storage 42 of the evaluation device 24 upon whose execution by the processor the receiving device executes the reception steps.

At the beginning of the transfer of the transmittal data blocks, in step S10 a transmittal data block identifier, here a block number BN which characterizes the transmittal data block and distinguishes from other transmittal data blocks, is initialized, i.e. set to an initial value, for example to 0 for a first transmittal data block. The block number characterizes the transmittal data block and thereby also the sequence of the Ethernet packets which the transmittal data block will be transferred with.

The following steps S12 to S18 are carried out for each transmittal data block.

In step S12, it is waited for a transmittal data block to be stored in the storage. The storage as a block does not necessarily mean that the data are stored in a contiguous memory area, however, this is preferably the case. When the data preprocessing device 30 stores the sensor raw data for the respective value document as a transmittal data block in its storage 34, a first transmittal data sub-block is established in step S12 and a sequence number SZ is set as a sequence identifier to an initial value, in the example zero. The sequence number SZ renders the order of the transmittal datum part blocks of the sequence with the block number BN.

In step S14, it is then checked whether the transmittal data sub-block is the last transmittal data sub-block of the transmittal data block. For this purpose it is checked which of the data were not yet employed and sent in the transmittal data block as a transmittal data sub-block.

If this is not the case, in step S16 an Ethernet packet is formed which comprises, on the one hand, the transmittal data sub-block and, on the other hand, besides the mentioned classical Ethernet-management data as protocol management data, the current sequence number SZ as a sequence number SN and the current block number BZ as a block number BN. The end bit is not set, because the transmittal data sub-block is the last transmittal data sub-block of the transmittal data block. The Ethernet packet is transmitted by means of the Ethernet interface, in the example the Ethernet controller 38, to the receiving device 24 and the counter SZ for the sequence number is incremented, i.e. increased by 1.

Next, step S14 is then newly executed for a next transmittal data sub-block.

If in step S12 it is ascertained that the current transmittal data sub-block is the last sub-block, an Ethernet packet is formed in step S18 which comprises the transmittal data sub-block and the status of the sequence number counter SZ as protocol management data for the current sequence number SN, the status of the current block number counter BZ as a block number BN and the now set final bit. The formed Ethernet packet is sent and the counter for the block number BZ is increased by 1. The method is then continued with step S12.

Step S12 is then carried out with the next transmittal data block.

Figure 5:
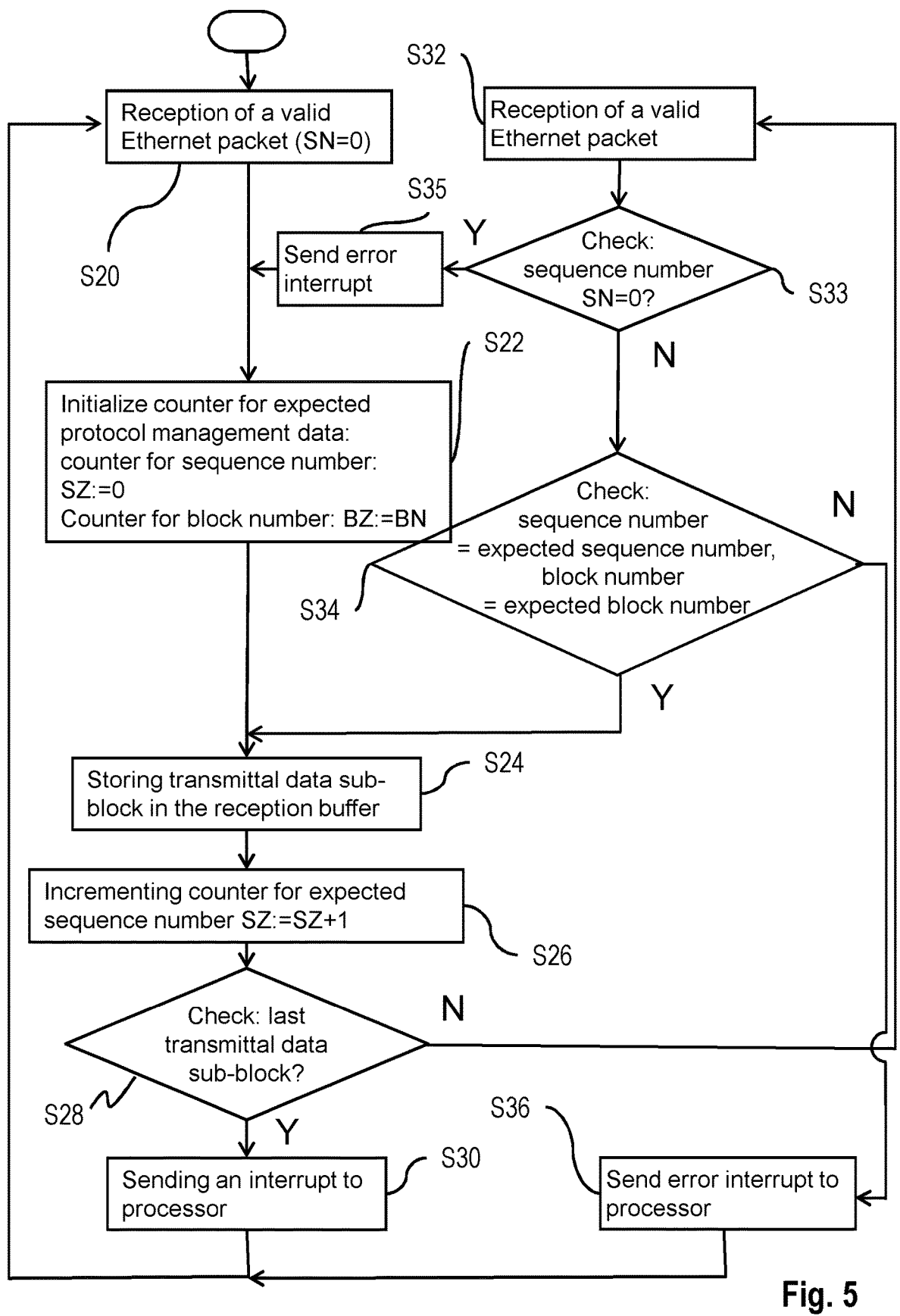

For the reception of the sent Ethernet packets, more precisely the following method or reception method is carried out by the receiving device 24 (cf FIG. 5).

The processor 40 makes one or several regions in the working memory 44 available to the FPGA 50 as a reception buffer; the size of these regions corresponds to the maximum size of a transmittal data block. For this purpose, it transmits corresponding data to the FPGA 50, for example regions of memory addresses.

When the Ethernet controller 48 is activated together with its PHY, this receives coming Ethernet packets from the transmitting device 22 and relays the received Ethernet packets to the FPGA 50. This employs the management data, more precisely the protocol management data, to write the transmittal data sub-blocks of the sequence of Ethernet packets to reception buffer 44, so that the transmittal data block is restored, and to send an interrupt to the processor 40 only after reception of all Ethernet packets of a sequence or with occurrence of an error.

The actual reception method for the reception of a transmittal data block or a sequence formed therefrom of Ethernet packets runs as follows:

For the reception of a new transmittal data block, the receiving device 46, more precisely the FPGA 50, waits in step S20 until the one or the other receives a valid Ethernet packet which constitutes the beginning of a valid transmittal data block. The check of the validity of the Ethernet blocks comprises the checks whether the Ethernet blocks are Ethernet blocks without CRC error, having appropriate target address and having appropriate length. Further, it checks whether the management data of the arrived Ethernet block has a sequence identifier which characterizes a starting block. In the example, it checks whether the management data contain the sequence number SN=0. In other embodiment examples, it can additionally be checked whether the block number on the side of the receiving device was not employed yet.

In step S22, the transmittal data block number BN and the sequence number SN are read from the first Ethernet packet as management data. Internal counters SZ or BZ for the sequence number to be expected next will be set to zero or for the transmittal data blocks to be expected next to BN.

In step S24, the FPGA 50 transfers the data of the transmittal data sub-block of this Ethernet packet to the reception buffer and stores this corresponding to the sequence number. For example, it can attach the transmittal data sub-block to, where applicable, previously stored transmittal data sub-blocks of the same transmittal data block or the same sequence of Ethernet packets.

In step S26, the internal counter SZ is incremented by 1.

In step S28, a check is then effected on the basis of the management data, more precisely of the protocol management data, whether the received Ethernet packet contains in its useful data the last transmittal data sub-block of the sequence of the Ethernet packets for the current transmittal data block. For this purpose, the presence of the end bit is checked.

If this is the case, the reception buffer will in step S30 be delivered to the processor 40, by the FPGA 50 sending an interrupt to this.

The processor 40 can now employ the data in the reception buffer. Substantially simultaneously, preferably before the employment, it makes a new reception buffer available to the FPGA 50, thus one or several other regions of the working memory 44. The total size of the regions corresponds to that at the beginning of the data transfer. The reception is then newly drawn up and next step S20 is executed for a further transmittal data block to be received.

If, however, there was recognized in step S28 that the current Ethernet packet is not the last of the sequence of the Ethernet packets for the current transmittal data block, the receiving portion 38, in particular the FPGA 50, waits in step S32, as in step S22, for a valid Ethernet block and receives this.

In the following step S33, it is checked by the receiving portion, in the example more precisely the FPGA 50, whether a first Ethernet packet was received for a transmittal data block, although the last transmittal data sub-block of the preceding transmittal data block was not yet received. For this purpose, it is checked whether the received Ethernet packet is the first of a sequence of Ethernet packets for a transmittal data block, by checking whether the sequence number is 0. The sequence number cannot assume this value upon completely received transmittal data blocks at this point of the method, but only in step S20.

If the sequence number is 0, an error message is hence generated in step S35 in the form of an error interrupt which is sent to the processor 40. This displays that the hitherto only partly received transmittal data block was only incomplete. However, because already a first Ethernet packet was received for a new transmittal data block, the method is continued with step S22. The received transmittal data sub-blocks which yield no complete transmittal data block are then discarded. The processor 40 can then again request the transmittal data block according to the circumstances.

Otherwise the method is continued with step D34.

In step S34, the FPGA 50 checks on the basis of the management data, more precisely the protocol management data, in the Ethernet packet whether this package is the next package to be expected, in the example the next one in the sequence. More precisely, it checks whether the sequence identifier SN in the management data is equal to the internal counter SZ and whether the transmittal data block identifier BN corresponds to the transmittal data-block number captured in step S22.

If this is the case, the FPGA 50 continues the method with step S24.

If the package is not according to expectation, i.e. a check or one of the checks in step S34 yields no match, an error message is generated in step S36 in the form of an error interrupts which is sent to the processor 40. The method is then continued with step S20. The received transmittal data sub-blocks are then discarded. The processor 40 then again requests the transmittal data block.

In this manner, the receiving portion 46 writes the transmittal data sub-blocks to the reception buffer 44 such that the transmittal data block is restored. In doing so, upon reception of all Ethernet packets for a transmittal data block, an interrupt is sent to the processor 40 only at the end, in the example in step S30, provided that no error occurs. The receiving portion 46, more precisely the processor 40, can then send a signal to the FPGA 50 by which it communicates the position of the reception buffer region for next transmittal data block to be received; the method is continued with step S20. Large transmittal data blocks can hence be received with low load on the processor by interrupts upon reception of the sequence of Ethernet packets. If transmittal data blocks are transferred successively, for example for two consecutive value documents, the processor 40 can, in the time after the interrupt after the end of the reception of the first of the transmittal data blocks, execute further objects, for example the at least partial evaluation of at least a part of the received transmittal data block, without disturbance by an interrupt and thereby quickly.

The receiving portion 46, more precisely the FPGA 50 is further preferably configured such that the processor 40 can send by means of the receiving device 24 data by means of the Ethernet interface 48 via the Ethernet connection 25.

A second embodiment example differs from the first embodiment example or the described variant in that the transmitting device generates for the one or the same transmittal data sub-block at least two, in the example three, Ethernet packets and transmits them to the receiving device. The receiving device receives the Ethernet packets and stores for Ethernet packets with the same transmittal data sub-block, the transmittal data sub-block at least once, so that altogether the transmittal data block is restored, even if one of the Ethernet packets is not received or is received only damaged.

The transmitting device and the receiving device differ from the transmitting device or the receiving device of the first embodiment example only by the instructions of the computer program in the storage 34 of the transmitting device or the design of the receiving portion 46, in the example of the configuration or programming of the FPGA 50 of the receiving device 24.

Figure 6:
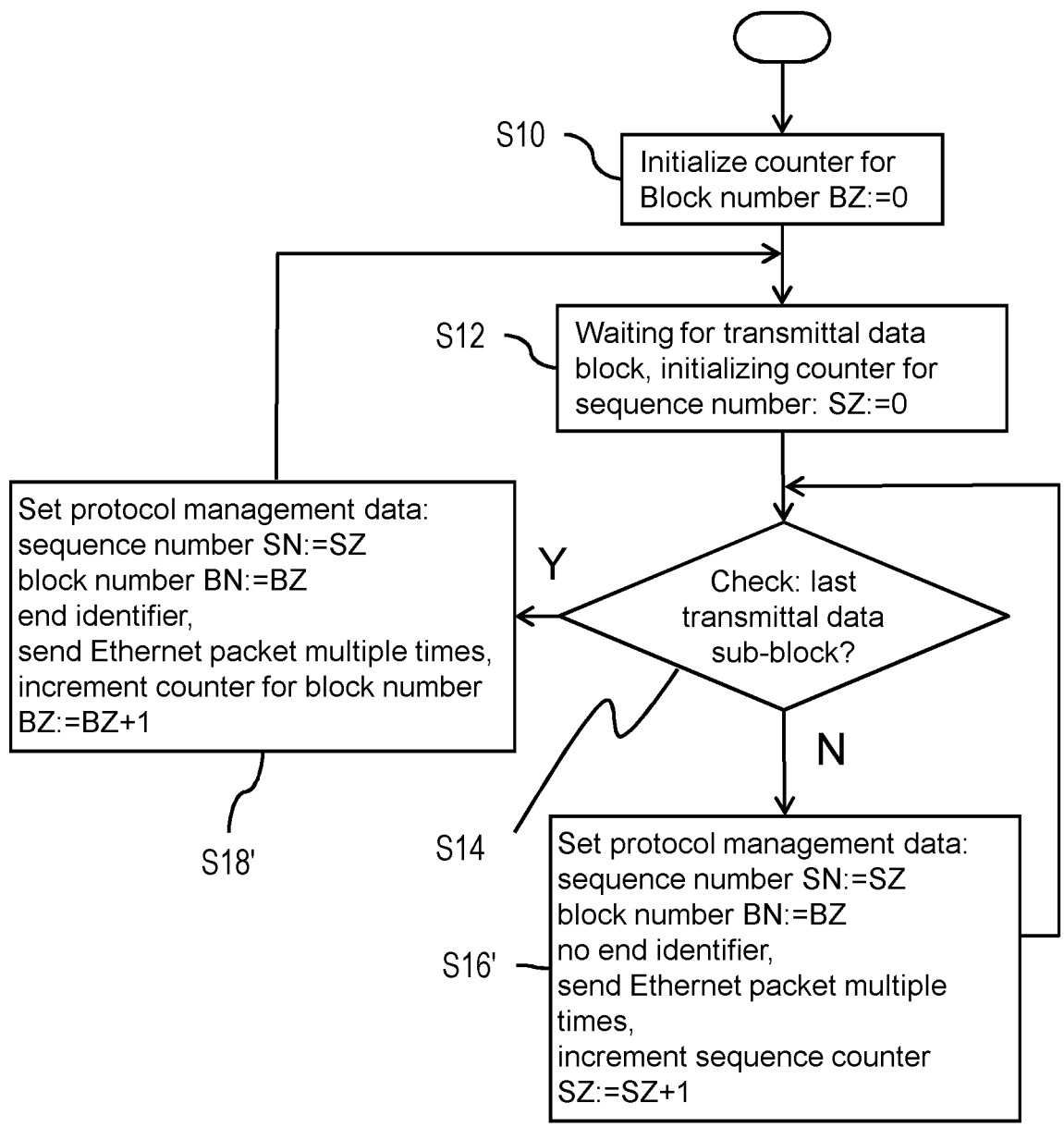

The instructions of the computer program in the storage 34 of the transmitting device are modified merely to the effect that upon their execution the transmission method illustrated in FIG. 6 is carried out. The transmission method differs from the transmission method of the first embodiment example merely in that step S16 is replaced by a step S16' and step S18 by a step S18'. In step S16', in contrast to the otherwise identical step S16, more than one Ethernet packet is sent for one transmittal data sub-block, in the example three Ethernet packets. In step S18', in contrast to the otherwise identical step S18, correspondingly for the last transmittal data sub-block more than one Ethernet packet are sent, in the example as many Ethernet packets as in step S16', thus here three Ethernet packets. In doing so, the Ethernet packets for the same transmittal data block contain the identical data, thus management data and the respective transmittal data block.

Figure 7:
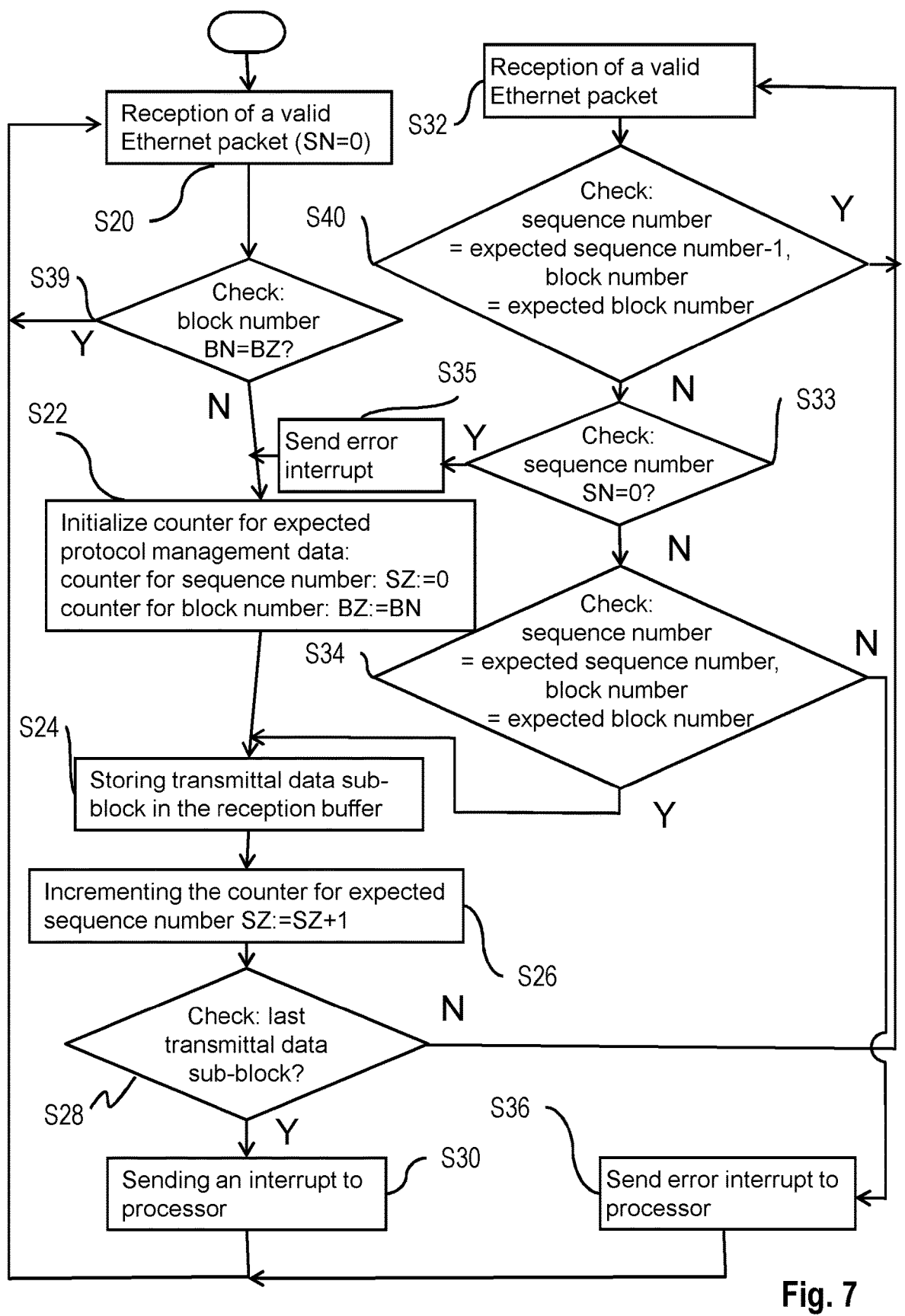

The receiving portion differs from the receiving portion 46 merely by the configuration or programming of the FPGA 50. The FPGA, more precisely its configuration or programming, is modified compared with the FPGA 50 such that it can from Ethernet packets transmitted by means of the transmission method for a transmittal data block restore the same, for which preferably the reception method illustrated in FIG. 7 is carried out. The reception method differs from the reception method of the first embodiment example by a step S39, executed in the example of the FPGA, which is executed after step S20 and a step S40 which is executed after step S32. Otherwise, the receiving methods do not differ from one another.

Step S39 serves to treat the sending of transmittal data blocks which fit in only one Ethernet packet, i.e. for whose sending the sequence of Ethernet packets comprises only one Ethernet packet. In step S20, a first Ethernet packet of a sequence of Ethernet packets is in general received for a transmittal data block. In the course of the following steps, in the example in step S22, as in the first embodiment example, the counters for the block number are set to the block number of the received first package of the sequence. Because in the case of a sequence with only one Ethernet packet, the first Ethernet packet is also the last, the method is continued with step S20. If this package is sent multiple times, thus first packages (SN=0) follow with identical block number. This can occur at this point of the method only if such a package was received for the second time. It must hence be discarded. In step S39 it is hence checked after step S20, whether the block number of the first Ethernet packet of the sequence corresponds to the value BZ of the counter for block numbers which was previously stored upon processing at least one received Ethernet packet. If this is the case, the Ethernet block, as explained above, was already received and the method is continued with step S20, without the transmittal data sub-block therein being again stored. Otherwise, i.e. if the block number BN of the received Ethernet packet does not match the last set value BZ of the counter for block numbers, the method is continued with step S22. If no transmittal data block was yet received, the value of BZ can be set to a value which corresponds to none at this stage possible value of the block numbers possible in the method, so that randomly erroneously Ethernet packets for a transmittal data block with only one transmittal data sub-block are not discarded.

There then follow steps S22 to S32 which are executed as in the first embodiment example.

After reception of a valid Ethernet packet in step S32, it is checked in step S40 whether or not a received Ethernet packet is the first Ethernet packet for a given transmittal data block and a given transmittal data sub-block.

For this purpose, it is checked whether the block number corresponds to the expected block number, i.e. the package relates to the same transmittal data block. Further, it is checked whether the sequence identifier contained in the management data corresponds to the expected sequence number −1. Because in step S26, upon successful storing of a transmittal data sub-block, the counter is incremented for the expected sequence number, in the case that the sequence identifier SN contained in the management data corresponds to the expected sequence number −1, i.e. SZ−1, the transmittal data sub-block has already been stored in a preceding step (S24), so that the Ethernet packet is not further treated. Rather, a further valid Ethernet packet is received in step S32.

If, in contrast, the sequence number SN contained in the management data corresponds to the value of the counter SZ for the expected sequence identifier, thus a first one of the at least two, in the example three, sent Ethernet packets was received for a transmittal data sub-block which is valid. The method is then continued for this transmittal data sub-block with step S33 as in the first embodiment example. If hence at least one of three Ethernet packets does not get lost upon the transfer and is not invalid, the transmittal data sub-block will be securely transferred.

Otherwise the method runs as in the first embodiment example.

Figure 8:
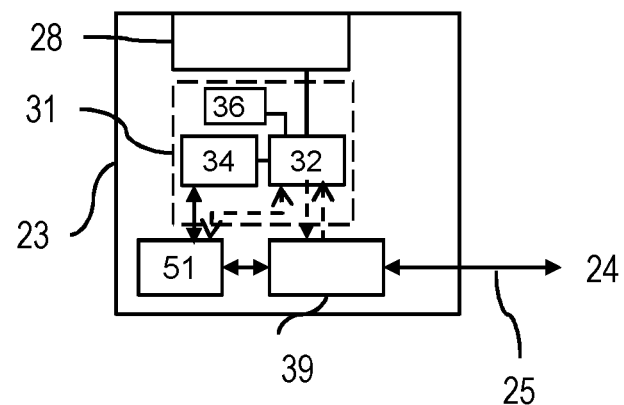

The third embodiment example differs from the first embodiment example merely by the design of the transmitting device. The transmitting device has an FPGA which forms the sequence of Ethernet packets for a given transmittal data block and sends it via the network interface 38. FIG. 8 shows very schematically the transmitting device 23 in a representation in which the arrows are to be understood as in FIG. 2 with respect to the receiving device 24. The transmitting device 23 differs from the transmitting device 22 of the first embodiment example, on the one hand, by the design of the data processing device 31, in which, for example in the storage 36, instructions of a computer program are stored upon whose execution by the processor in connection with the FPGA 51, the hereinafter described transmission method is carried out. Apart from that, the data processing device 31 corresponds to the data processing device 30 of the first embodiment example, except for the connections to the FPGA 51.

Further, the FPGA 51 is now provided, which is connected via control and data connections to the data processing device 31, in particular to the processor 32 or to the working memory 34. Furthermore, it is connected to the Ethernet controller 39 who differs from the Ethernet controller 32 by the fact that in this embodiment example it has no DMA functionality.

The other components of the transmitting device 23 do not differ from those of the transmitting device 22 of the first embodiment example. The FPGA 51 is configured or programmed to carry out the following methods in interaction with the data processing device 31.

Upon the capture of the sensor raw data, the data processing device 31, more precisely its processor 32, compiles the data in a working memory 34, serving as a transmission buffer, as a transmittal data block and delivers this—by transmitting the data describing the region—to the FPGA 51.

The FPGA 51 then executes the following steps which correspond to those of the transmission method of the first embodiment example. After reception of the data describing the region, it compiles for respectively a transmittal data sub-block the management data as in the first embodiment example and delivers this together with the respective transmittal data sub-block to the Ethernet controller 39 which sends this.

When the last transmittal data sub-block has been sent, the FPGA 51 issues an interrupt to the data processing device 31, in the example more precisely the processor 32, which signals that the sending of the transmittal data block is ended.

On receipt of the interrupt, the data processing device 31, more precisely its processor, can transfer the data of the next transmittal data block to the transmission buffer, or, in other variants, correspondingly generate only data describing the location in the working memory 34 and transmit it to the FPGA 51.

Further embodiment examples differ from the described embodiment examples by the fact that the receiving device is respectively configured also such that it constitutes a transmitting device. For this purpose, the FPGA is respectively additionally configured or programmed, and the receiving device 24 has instructions in the storage 42, such that upon their executing, the processor carries out the transmission method described in the preceding embodiment examples in connection with the receiving portion, wherein the storage 44, more precisely a corresponding region of the storage 44, corresponds to the transmission buffer or storage 34 in which the transmittal data block to be sent is stored. Further, the FPGA, like the FPGA 50, is configured or programmed and additionally in such a way that it works like the FPGA 51, i.e. together it executes with the processor steps which correspond to those of the transmission method of the first embodiment example. In a variant, it could also execute steps which correspond to those of the transmission method of the second embodiment example.

Figure 9:
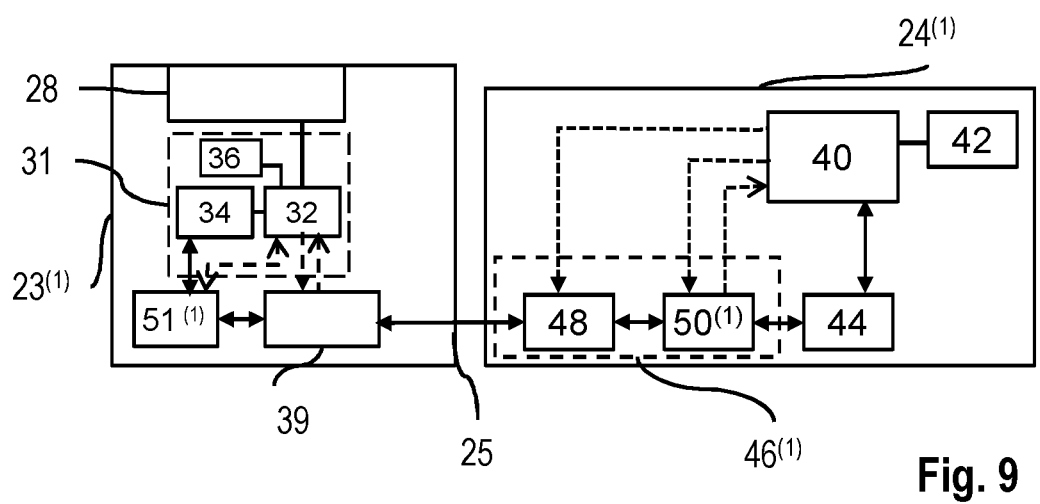

In such a fourth embodiment example, in FIG. 9, the transmitting device $23^{(1)}$ is altered, compared with the transmitting device 23 of the third embodiment example, only to the extent as it is configured to also receive transmittal data packages analogously to the receiving device. For this purpose, the program for the processor 32 is changed and the FPGA $51^{(1)}$ additionally programmed or configured such that it executes steps of the reception method of the third embodiment example in connection with the Ethernet interface 39, the storage 34 and the processor 32. The evaluation device or receiving device 24 is replaced by an evaluation device or receiving device $24^{(1)}$ which, compared with the receiving device 24, is additionally designed such that it constitutes respectively also a transmitting device. For this purpose, the FPGA $50^{(1)}$ is respectively additionally configured or programmed, and the receiving device $24^{(1)}$ has such instructions in the storage 42, such that upon executing the instructions, the processor carries out the transmission method described in the preceding embodiment examples in connection with the receiving portion $46^{(1)}$, wherein the storage 44, more precisely a corresponding region of the storage 44, corresponds to the transmission buffer or storage 34 in which the transmittal data block to be sent is stored. Otherwise the receiving portion $46^{(1)}$ does not differ from the receiving portion 46. The FPGA $50^{(1)}$ is hence configured or programmed like the FPGA 50 and additionally in such a way that it works like the FPGA 51, i.e. executes together with the processor steps which correspond to those of the transmission method of the first embodiment example. In a variant, it could also execute steps which correspond to those of the transmission method of the second embodiment example.

In the fifth and sixth embodiment example, the receiving device 24, in the example the evaluation device, processes sensor raw data for value documents of at least two different sensor devices which are connected to the evaluation device via Ethernet connections.

Figure 10:
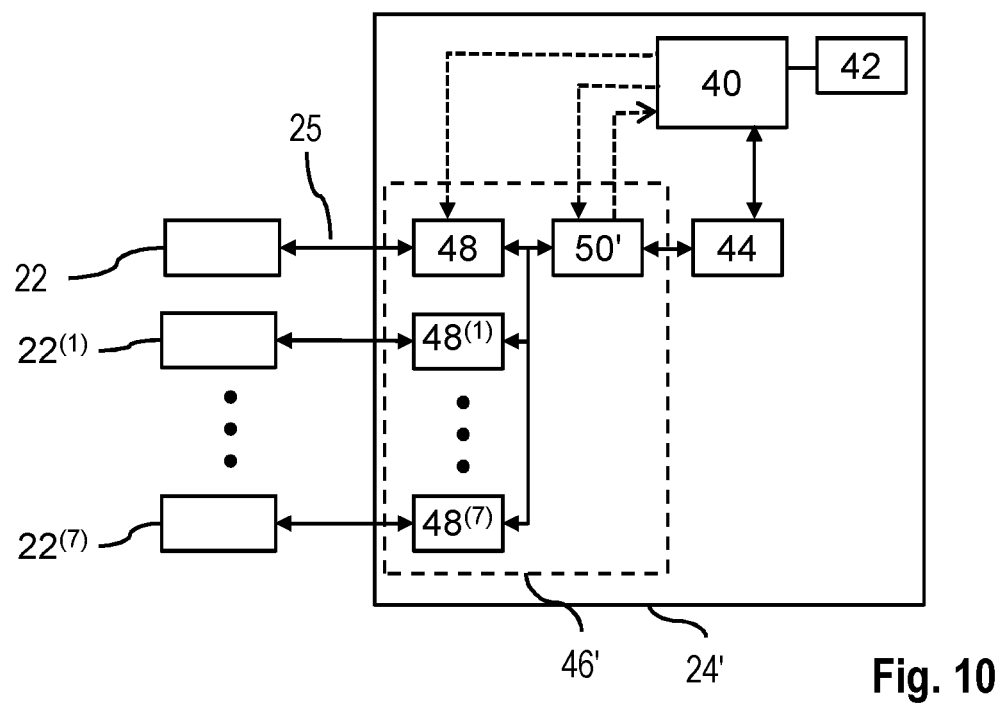

In the fifth embodiment example illustrated schematically in FIG. 10, the at least two sensor devices, in the example eight sensor devices 22, $22^{(1)}$ ..., $22^{(7)}$, are connected to an evaluation device 24' via point-to-point Ethernet connections 25. In the example, the Ethernet connections are 1 Gbit Ethernet connections.

The sensor devices 22, $22^{(1)}$, ..., $22^{(7)}$ are, as far as the transfer of the respective sensor raw data are concerned, configured like the sensor device of the first embodiment example. Merely the device for capturing the physical properties, corresponding to the detector 28, and the programming corresponding to the sensor data of the processor can be different. For example, at least one of the sensor devices can contain another optical sensor or a spatially resolving magnetic sensor or a spatially resolving ultrasonic sensor. Each of the sensor devices executes the transmission method described in connection with the first embodiment example.

The evaluation device 24' differs from the evaluation device 24, on the one hand, by the fact that the receiving portion 46 is replaced by a receiving portion 46'. This differs from the receiving portion 46' firstly by the fact that this has at least two, in the example 8 network interfaces 48, $48^{(1)}$, ..., $48^{(7)}$, with respectively one PHY. Respectively one of the sensor devices 22, $22^{(1)}$, ..., $22^{(7)}$ is connected via a separate Ethernet connection to one of the sensor devices corresponding PHY via a 1 GBit Ethernet connection. The network interfaces are connected to an FPGA 50' which is designed for executing corresponding steps of the method described hereinafter. Of the control connections of the processor 40 to the network interfaces, for clarity's sake only those from the processor 40 to the network interface 48, are shown in FIG. 10.

In this embodiment example, the network interfaces, besides the PHY, can also contain respectively an Ethernet controller which is connected to the FPGA 50'.

The FPGA 50' is connected, as in the first embodiment example, via a data connection to the working memory 44 and via control connections to the processor 40.

The receiving device or evaluation device 24' differs from the evaluation device 24 of the first embodiment example further by the fact that the instructions in the storage 42 are changed and contain instructions upon whose execution the processor 40, for each of the transmitting devices or sensor devices, makes a reception buffer region available and employs this in dependence on corresponding control signals of the FPGA 50'. In particular, it then executes respectively steps analogously to those of the first embodiment example. Further, the instructions contain the instructions upon whose execution the received transmittal data blocks, among other things, are evaluated.

The FPGA 50' is designed and in particular configured and/or programmed such that it can simultaneously process a count of reception buffer regions corresponding to the count of the transmitting devices, in the example sensor devices, wherein for each connection between one of the transmitting devices and the evaluation device, a separate set is kept in management data. The FPGA 50' is further designed and in particular programmed such that it associates the incoming Ethernet sub-blocks sent by the sensor devices on the basis of the Ethernet source address with the appurtenant reception buffer and the appurtenant management data, and evaluates these respectively according to the first embodiment example.

For sending, each of the sensor devices executes steps of a transmission method as a transmitting device, as it is described in the first embodiment example. The management data of the Ethernet packets for transmitting a transmittal data block of one of the sensor devices or transmitting devices are characterized by an identical MAC address characterizing the sensor device.

The reception method executed by the evaluation device 46' as a receiving device runs for each of the transmitting devices substantially analogously to the first embodiment example, with the following modifications.

The FPGA 50' can process several reception buffers for received Ethernet packets simultaneously. In the present embodiment example, a reception buffer is provided for each of the transmitting devices. The FPGA 50' is further configured or programmed such that it keeps a separate set of management data for each of the connections to the transmitting devices.

Upon executing at least some of the instructions in the storage 42, the processor 40 supplies a separate reception buffer region for each of the transmitting devices (in FIG. 10 only the working memory 44 is represented in which the buffer regions can be located). It transmits corresponding data to the FPGA 50' which describe or define the reception buffer regions. It stores the data describing the respective reception buffer regions, for example identifier for the transmitting device, start address and size and/or end address of the buffer region.

The FPGA 50' is configured or programmed such that it establishes, after reception of a valid Ethernet packet, the associated reception buffer on the basis of the Ethernet source address in the management data and with this then executes the reception steps described in the first embodiment example, in which the appurtenant variables associated with the management data, for example the counters, for the transmitting device given by the Ethernet source address are separately held and treated. In doing so, the interrupts which are finally sent also state respectively which of the reception buffers, and thereby a transmittal data block, which of the transmitting device it relates to.

Figure 11:
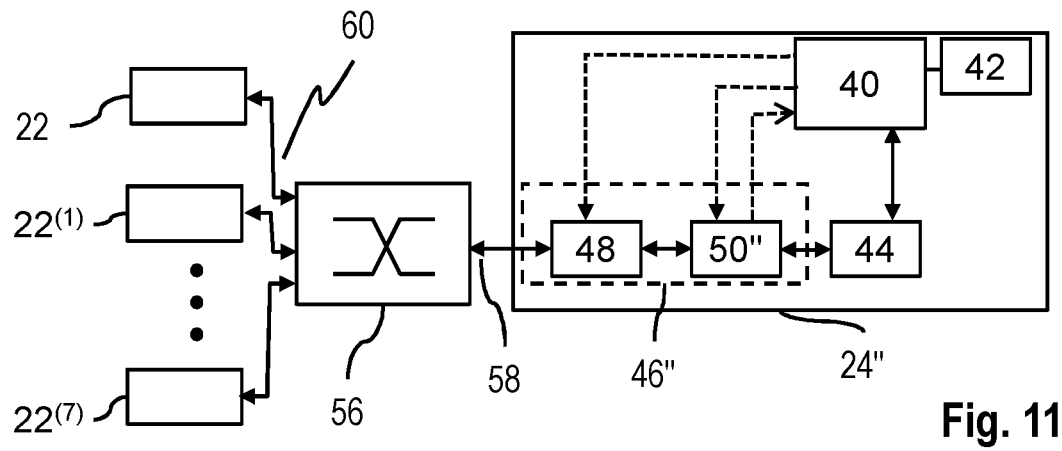

The sixth embodiment example in FIG. 11 differs from the fifth embodiment example by the fact that the, otherwise unchanged, at least two, in the example eight, sensor devices are connected as transmitting devices 22, 22$^{(1)}$, ..., 22$^{(7)}$ for an Ethernet switch 56 to an evaluation device 24" as a receiving device. In doing so, the sensor devices can be connected to the Ethernet switch and the Ethernet switch to the evaluation device via Ethernet connections of different transfer speeds. The Ethernet connection between the Ethernet switch and the receiving device or evaluation device 24" has a transfer speed which is at least as high as the highest one of the transfer speeds of the Ethernet connections between the Ethernet switch and the transmitting device or sensor devices. In the example, the Ethernet connection 58 between the Ethernet switch 56 and the evaluation device 24" is a 10 GBit Ethernet connection, the Ethernet connection 60 between the Ethernet switch 56 and the sensor devices 22, 22$^{(1)}$, ..., 22$^{(7)}$ are 1 GBit Ethernet connections.

The receiving device 24" differs from the receiving device 24' of the fifth embodiment example by the fact that the receiving portion 46' is replaced by a receiving portion 46". The latter differs from the receiving portion 46', on the one hand, by the fact that only the network interface 48 is provided, which is configured like the network interface 48 of the second embodiment example. On the other hand, the FPGA 50' is replaced by an FPGA 50" which has only one connection to the network interface 48, but treats the Ethernet packets coming via this interface as in the second embodiment example. The processor 40 and the storages 42 are designed as in the second embodiment example, the instructions of the computer program such that the identical processing of data, in particular received data, is executed and the storage 44 having the reception buffers for the transmitting devices is identically managed.

A further embodiment example differs from the sixth embodiment example only by the design of the Ethernet switch 56. In principle, the case could occur that in the event the Ethernet switch is a simple Ethernet switch, this discards individual Ethernet packets in an overload situation. In the method of the first or sixth embodiment example, this would lead to the entire transmittal data block for whose transfer the Ethernet packet was employed having to be sent again. In particular, the coming Ethernet packets could simultaneously arrive from the sensor devices. Because, however, only one Ethernet connection for relaying to the evaluation device is available, an overload situation could result.

The Ethernet switch 56 is hence devised that it has buffer memory regions for a count of Ethernet packets which corresponds to twice the count of transmitting devices, in the example sensor devices, connected thereto. The Ethernet switch is then devised such that a buffer memory region is available for each of the transmitting devices to be able to intermediately store a received Ethernet packet coming from the respective sensor device. Further, the Ethernet switch is devised such that the other half of the buffer memory regions, thus a count corresponding to the count of the sensor devices, is devised for buffering of Ethernet packets, which coming from the evaluation device should be relayed to the sensor devices. This avoids overload situations which can arise from the fact that the transfer of Ethernet packets from the evaluation device to one or several of the sensor devices can be faster because of the faster Ethernet connection than a transfer from the Ethernet switch to the sensor devices via slower Ethernet connections between the Ethernet switch and the sensor devices.

Should the evaluation device in these two embodiment examples transfer data respectively to the transmitting devices, the hereinafter described transmission method can preferably be employed, for whose carrying out the instructions executable by the processor 40 and stored in the storage 42 have corresponding instructions, and the FPGA 50' or 50" is correspondingly modified.

The evaluation device or receiving device 4 or 24" is designed such that it constitute respectively also a transmitting device. For this purpose, the FPGA 50' or 50" is respectively additionally configured or programmed, and the receiving device 24' or 24" has such instructions in the storage 42, such that upon executing the instructions, the processor carries out the transmission method described in the preceding embodiment examples in connection with the receiving portion, wherein the storage 44, more precisely a corresponding region of the storage 44, corresponds to the transmission buffer or storage 34 in which the transmittal data block to be sent is stored. Further, the FPGA, like the FPGA 50' or 50", is configured or programmed and additionally in such a way that it works like the FPGA 51, i.e. together with the processor it executes steps which correspond to those of the transmission method of the first embodiment example. In a variant, it could also execute steps which correspond to those of the transmission method of the second embodiment example.

Further, the FPGA of the evaluation device is firstly respectively designed and programmed such that it processes several transmission buffers, in the example a count of transmission buffers corresponding to the count of sensor devices, simultaneously and keeps a separate set of management data for each connection to one of the sensor devices. To this extent, the transmission method can be employed separately for each of the sensor devices which runs like the method in the first embodiment example, but while employing an FPGA as described above.

To make a better overall throughput possible, the FPGA of the evaluation device is secondly designed and programmed such that the FPGA sends the individual transmittal data sub-blocks in rotating manner, e.g. a sub-block to the sensor device 22, then a sub-block to the sensor device 22$^{(1)}$ etc. and then a sub-block to the sensor device 22$^{(7)}$. Thus, the Ethernet connections to the sensor devices can be operated simultaneously if possible, so that a particularly good overall throughput can be attained.

In the case of the employment of an Ethernet switch as in the sixth embodiment example, thirdly the FPGA of the evaluation device is designed and programmed such that the FPGA keeps a dead time to be adhered to for each sent transmittal data sub-block which is formed from a given transmittal data block, and is intended for the same Ethernet target address which the respective sensor device is associated with, said dead time being chosen such that it is ensured that the previous block has already left the Ethernet switch at the end of the dead time; the length of the dead time can depend in particular also on the presence and the size of a buffer of the switch. In the example, it results from the length of the transmittal data sub-block and the transfer rate of the sensor linking. The next Ethernet sub-block with the same Ethernet target address is sent only at the end of this dead time.

Figure 12:
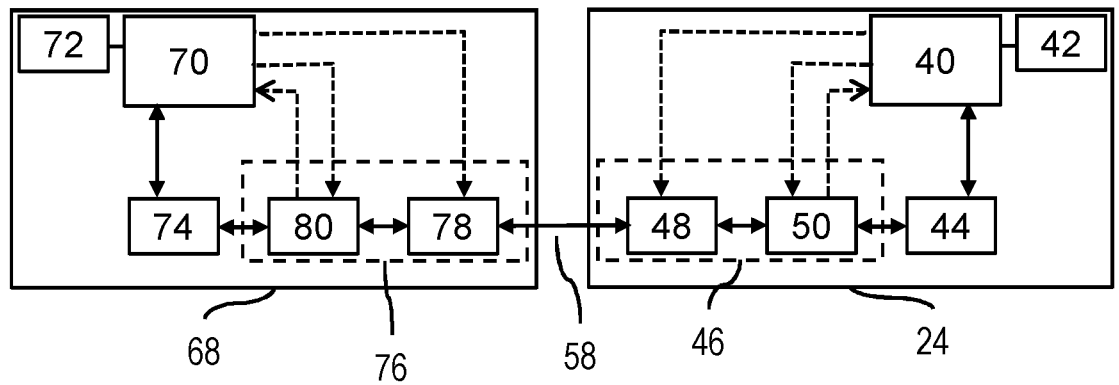

A further embodiment example in FIG. 12 differs from the first embodiment example therein that the transmitting device, in the example the sensor device 22, is replaced by a receiving device in the form of the second evaluation device 68 which is designed like the evaluation device 24 of the first embodiment example, hereinafter designated as the first evaluation device. The two evaluation devices are connected by an Ethernet connection 58 which in the example can be 10 GBit Ethernet connections.

Analogously to the first evaluation device 24, the second receiving device 68 has a processor 70 corresponding to the processor 40, a storage 72 corresponding to the storage 42, a working memory 74 corresponding to the working memory 44, and a receiving portions 76 corresponding to the receiving portion 46. The receiving portion 76 has an FPGAs 80 corresponding to the FPGA 50 and a network interfaces 78 corresponding to the network interface 48. These components are interconnected as in the first embodiment example and work in the same manner except for the modifications described hereinafter.

The instructions in the storage 72 differ from those in the storage 42 to the extent that firstly upon execution by the processor 70, the evaluation of data is changed by the evaluation device according to its tasks.

On the other hand, the instructions comprise the instructions upon whose execution by the processor 70 in connection with the FPGA 80, transmittal data blocks in the storage 72 can be sent to the evaluation device 24 with a method according to the invention. For this purpose, the FPGA 80 is designed and configured or programmed such that it executes, besides the functions of the FPGA 50, the functions of the FPGA 51 of the third embodiment example for sending transmittal data blocks. In a corresponding manner, the instructions in the evaluation device 24 and the configuration or programming of the FPGA 50 therein are changed.

In variants of this embodiment example, the respective FPGA can also be replaced by two FPGAs, wherein for this purpose one is configured or programmed to execute steps for sending transmittal data blocks and the other is configured or programmed to execute steps for receiving Ethernet packets of a sequence of Ethernet packets for a transmittal data block.

Figure 13:
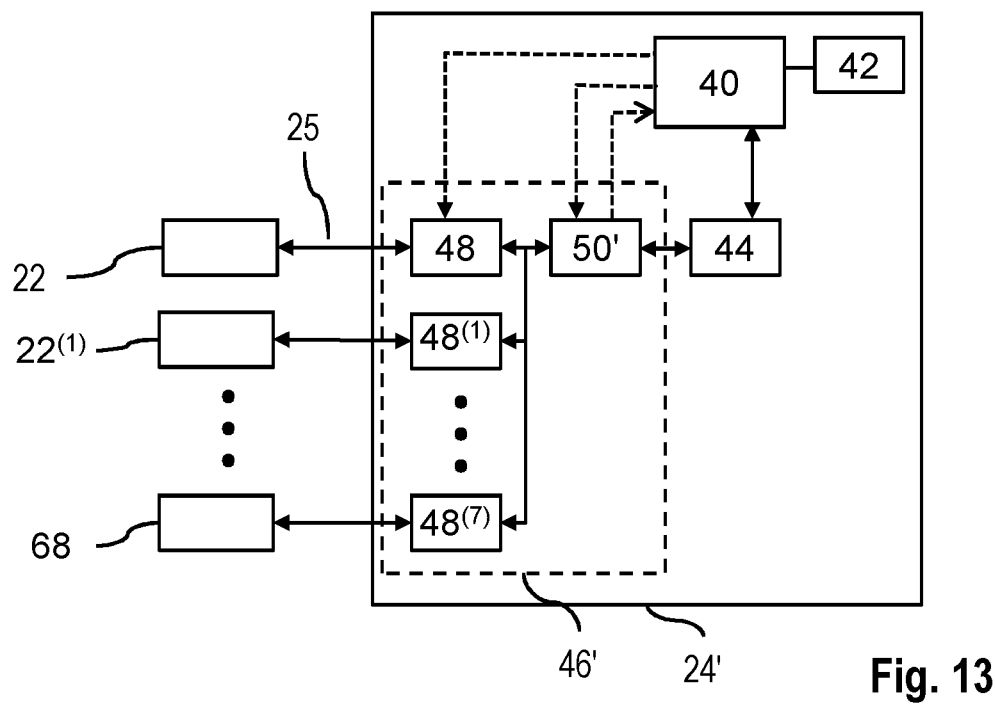

Still a further embodiment example in FIG. 13 differs from the fifth embodiment example by the fact that at least one of the sensor devices, the sensor device 22$^{(7)}$, is replaced by a further evaluation device, the evaluation device 60. In doing so, the evaluation devices are interconnected via a point-to-point Ethernet connection. In doing so, the reference signs designate the identical components and the executions for this purpose hold also here accordingly.

Figure 14:
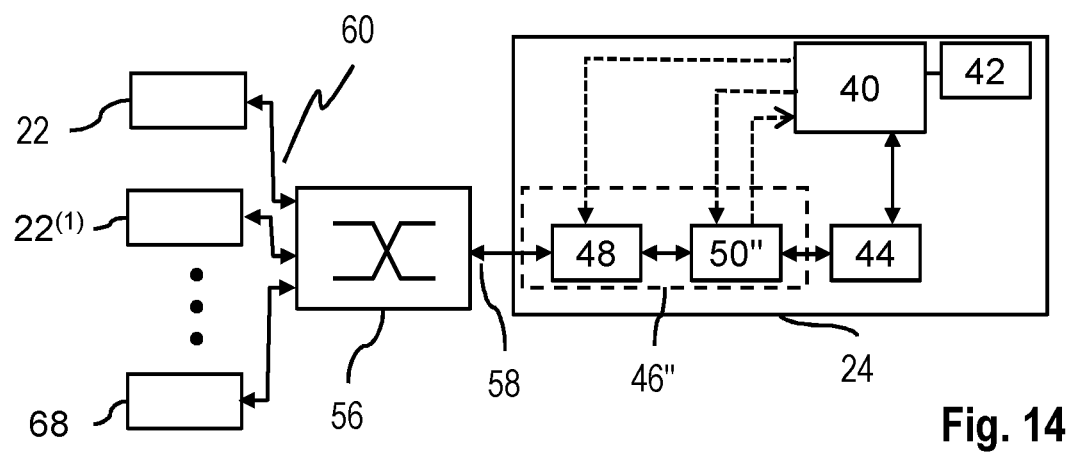

Still a further embodiment example in FIG. 14 differs from the sixth embodiment example by the fact that at least one of the sensor devices, the sensor device 22$^{(7)}$ is replaced by a further evaluation device, the evaluation device 60 of the preceding embodiment example. The evaluation devices and the sensor device or sensor devices are connected via the Ethernet switch 56 by means of Ethernet connections. In the example, the Ethernet connections between the evaluation devices are 10 Gbit connections, however, connections having low data rate would also be possible. In order not to overload the Ethernet switch, the available data rate, which is made available by the Ethernet switch, can be divided among the subscribers for which in particular the described method of the rotating sending can be employed with adherence to dead times. In doing so, the reference signs designate the identical components and the executions for this purpose hold also here accordingly.

In other variants of this embodiment at least one sensor device or some of the sensor devices or all sensor devices can be replaced by the corresponding evaluation devices which are designed like the evaluation device 68.

In other embodiment examples the management data of an Ethernet block of a sequence can be formed such that from the management data is establishable whether it is a start block or end block. In this manner the beginning of a sequence can easily be recognized for a new transmittal data block.

In other embodiment examples, management data could contain the total number SA of the sub-blocks instead of the end bit besides the ascending sequence numbers SN. The last sub-block or the last Ethernet packet or the final block is then identified by the sequence number SA-1. For this purpose, in the transmission method in step S12 the size of the transmittal data block is established and from it, for a given size of transmittal data sub-blocks, the count SA of the transmittal data sub-blocks and thereby Ethernet packets. The protocol management data formed in step S16 for Ethernet packets of the sequence then contain this amount SA. For checking whether the last sub-block has arrived, step S28 is then correspondingly changed; it is checked whether the sequence number is equal to SA-1.

In still other embodiment examples, descending sequence numbers or other numerical orders could be employed in the protocol management data. In step S12 of the transmission method in FIG. 4, for example after the establishment of the count SA-1 of the transmittal data sub-blocks, which can be effected as described hereinabove, the counter for the sequence number can then be initialized to the count SA-1. In step S14, it can be checked whether the current sequence number is 0. In this case the method would be continued with step S18, otherwise the sequence number would be lowered (decremented) by one in the modified step S16 instead of incremented. Correspondingly, in the reception method in FIG. 5 in step S22, the counter SZ can be set to the sequence number of the first received transmittal data sub-block for a respective transmittal data block which is SA-1. In step S26, incrementing is replaced by decrementing, in step S28 it is checked whether the sequence number in the management data is zero. Then the last transmittal data sub-block is present, otherwise not.

Alternatively its sequence number could be set to the value 0 upon recognizing the last transmittal data block.

In other embodiment examples, instead of the optical sensor or in addition to this, the transmitting device can have a highly spatially resolving magnetic sensor for the spatially resolved capture of magnetic properties of value documents, whose sensor raw data are transferred via an Ethernet connection to the evaluation device for evaluation.

Figure 15:
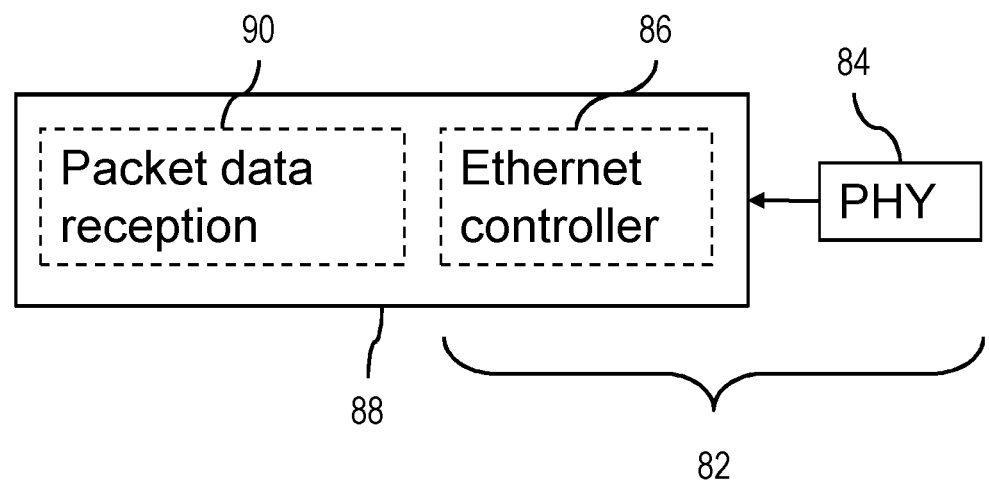

Further embodiment examples can differ from the described embodiment examples by the fact that the network interfaces are differently designed. In the transmitting device and/or receiving device, the PHYs can be present as a separate component. The function of the Ethernet controller can then be taken over by the correspondingly modified FPGA of the transmitting device and/or receiving device. FIG. 15 shows this for an Ethernet interface 82 in a block representation. The physical Ethernet connection is connected to the PHY 84. The Ethernet controller 86 is implemented in the FPGA 88 in which also the processing of the Ethernet packets or the data therein by the block 90 is illustrated.

Still other embodiment examples can differ from the above-described embodiment examples by the fact that in the Ethernet packet header, the type field is employed for protocol management data.

In the examples, no other known protocol, for example the Internet Layer and/or Transport Layer like TCP or UDP, is employed upon the transfer of the Ethernet packets.

The invention claimed is:

1. A method for transferring a transmittal data block from a transmitting device, for example at least a part of a sensor or a part of an evaluation device, preferably for evaluating transmittal data, via an Ethernet connection to a receiving device, wherein the receiving device comprises an evaluating device for evaluating transmittal data, which has a storage for storing a transferred transmittal data block, and a processor for at least partially processing the transferred transmittal data block stored in the storage, wherein the transmittal data in the transmittal data block are sensor data of a sensor for the examination of value documents, in which the transmitting device forms from the data of the transmittal data block a sequence of Ethernet packets, which comprise respectively management data and a transmittal data sub-block, which is formed from at least a part of the data, so that the transmittal data sub-blocks of the Ethernet packets of the sequence comprise the data of the transmittal data block, wherein the management data comprise management data, from which is establishable whether one of the Ethernet packets is the last Ethernet packet of the sequence, and sends the formed Ethernet packets via the Ethernet connection to the receiving device, and in which the receiving device receives the Ethernet packets of the respective sequence and while employing at least a part of the management data writes the transmittal data sub-blocks of the received Ethernet packets of the sequence of Ethernet packets for the transmittal data block to the storage, wherein not upon or after the writing each of the transmittal data sub-blocks an interrupt is sent to the processor, wherein the processor at least partially processing the transferred transmittal data block stored in the storage comprises at least partially evaluating the sensor data, and wherein the processor at least partially evaluates the transferred transmittal data block while a subsequent transmittal data block is received.

2. The method according to claim 1, in which a receive signal, for example an interrupt, is emitted to the processor, preferably emitted only if a pre-specified amount of Ethernet packets of the sequence were received and the data of the transmittal data sub-blocks therein were written to the storage and/or upon receiving or storing at least one pre-specified error occurs and/or the transmittal data from the useful data block of the last Ethernet packet of the sequence were written to the storage.

3. The method according to claim 1, in which the receiving device has a Field Programmable Gate Array (FPGA), and in which by means of the FPGA, while employing the management data, the transmittal data sub-blocks from received Ethernet packets are written to the storage and in which preferably the FPGA triggers the emitting of a receive signal, for example an interrupt, to the processor after recognition and/or writing of the last transmittal data sub-block.

4. The method according to claim 1, in which the management data of each of the Ethernet packets of the sequence of Ethernet packets can comprise a sequence identifier for the transmittal data block which characterizes the transmittal data sub-block such that upon their employment, the transmittal data block can be formed from the transmittal data sub-blocks, and the sequence identifier is employed for writing the transmittal data sub-blocks to the storage.

5. The method according to claim 1, in which the management data of each of the Ethernet packets of the sequence of Ethernet packets comprise a sequence identifier for the transmittal data block which characterizes the transmittal data block.

6. The method according to claim 1, in which for at least one of the transmittal data sub-blocks at least two Ethernet packets are formed whose useful data block contains respectively the transmittal data sub-block, and are sent via the Ethernet connection to the receiving device, and upon reception of more than one Ethernet packet for the same transmittal data sub-block the data of the transmittal data sub-block are written only once to the storage or the data of the transmittal data sub-block are overwritten in the storage.

7. The method according to claim 1, in which at least one further transmitting device forms from the data of a further transmittal data block to be sent by it a further sequence of Ethernet packets which comprise respectively management data and a transmittal data sub-block which is formed from at least a part of the data, so that the transmittal data sub-blocks of the Ethernet packets of the further sequence comprise the data of the further transmittal data block, wherein the management data comprise management data, from which is establishable whether one of the Ethernet packets is the last Ethernet packet of the further sequence, and sends the formed Ethernet packets via the Ethernet connection to the receiving device, and in which the receiving device, after receiving the Ethernet packets, processes these in dependence on the transmitting device which has sent these, preferably separated according to transmitting device.

8. A transmitting device for sending at least one transmittal data block, for example in the form of a sensor or a part of an evaluation device, to a receiving device comprising:

a transmission buffer for the at least partially and temporarily storing data of the transmittal data block, the data of the transmittal block being sensor data of a sensor for the examination of value documents, an Ethernet interface, and is designed to form a sequence of Ethernet packets from the transmittal data block which respectively comprise management data and a transmittal data sub-block formed from the respective transmittal data block, so that the transmittal data sub-blocks of the Ethernet packets of the sequence comprise the data of the transmittal data block, wherein the management data comprise management data from which is establishable whether one of the Ethernet packets is the last Ethernet packet of the sequence, and to send the Ethernet packets via the Ethernet interface, wherein a processor of the receiving device that at least partially processes the sent transmittal data at least partially evaluates the sensor data, and wherein the processor of the receiving device at least partially evaluates the sent transmittal data block while a subsequent transmittal data block is received from the transmitting device.

9. The transmitting device according to claim 8, which further has a processor and instructions of a computer program upon whose execution the processor of the transmittal data block forms the sequence of Ethernet packets in the transmission buffer.

10. The transmitting device according to claim 8, which has a Field Programmable Gate Array (FPGA) connected to the Ethernet interface or at least forming a part of the Ethernet interface, which is programmed such that it forms from the transmittal data block Ethernet packet, the management data and the transmittal data sub-blocks for the respective sequence of Ethernet packets.

11. The transmitting device according to claim 8, in which the Ethernet interface has an Ethernet controller, having an internal DMA functionality which is designed such that it can process descriptor lists independently.

12. A receiving device for receiving sequences of the Ethernet packets which are formable by a transmitting device and contain respectively transmittal data sub-blocks of a transmittal data block, comprising:
  a storage for storing a transferred transmittal data block, data of the transmittal block being sensor data of a sensor for the examination of value documents,
  a processor for at least partially processing the transmittal data block stored in the storage, and
  a receiving portion which is designed for receiving sequences of Ethernet packets having data of the transmittal data block and writing respectively the transmittal data sub-blocks contained in the received Ethernet packets while employing at least a part of the management data in the storage,
wherein the receiving portion is further designed such that the receiving portion does not send an interrupt to the processor upon or after the writing of each of the transmittal data sub-blocks,
  wherein the processor at least partially processing the transferred transmittal data block stored in the storage comprises at least partially evaluating the sensor data, and
  wherein the processor at least partially evaluates the transferred transmittal data block while a subsequent transmittal data block is received.

13. The receiving device according to claim 12, in which the receiving portion is designed such that it emits a receive signal, for example an interrupt, to the processor, preferably emits only if a pre-specified amount of Ethernet packets of the same sequence were received and the transmittal data of the transmittal data sub-blocks therein were written to the storage and/or upon receiving or storing at least one pre-specified error occurs and/or the transmittal data from the useful data block of the last Ethernet packet of the sequence were written to the storage.

14. The receiving device according to claim 12, in which the receiving portion has a Field Programmable Gate Array (FPGA), wherein the receiving portion is designed such and the FPGA is configured or programmed such that by means of the FPGA, while employing the management data, the transmittal data sub-blocks from received Ethernet packets are written to the storage, and that the FPGA preferably after writing the transmittal data sub-blocks of a pre-specified amount of Ethernet packets of the sequence to the storage and/or writing of the last transmittal data sub-block of the sequence, triggers the emitting of a receive signal, for example an interrupt, to the processor.

15. The receiving device according to claim 14, in which the receiving portion has a Physical Layer (PHY) which is connected to the FPGA via a data connection, wherein the FPGA is further configured or programmed such that it works as an Ethernet controller.

16. The receiving device according to claim 14, in which the FPGA, the processor and the storage are connected via a Peripheral Component Interconnect Express (PCIe) network.

17. The receiving device according to claim 14, which comprises several Physical Layer (PHY) which are connected to the FPGA, and the FPGA is programmed such that transmittal data sub-blocks of Ethernet packets, which were received from a respective one of the PHY, respectively are written to the storage.

18. The receiving device according to claim 12, which also comprises a transmitting device, wherein the Ethernet interface of the transmitting device is given by a portion of the receiving portion which also works as an Ethernet interface of the transmitting device.

* * * * *